(12) United States Patent
Gorman et al.

(10) Patent No.: US 6,370,149 B1
(45) Date of Patent: *Apr. 9, 2002

(54) TELECOMMUNICATION SYSTEM, METHOD AND SUBSCRIBER UNIT FOR USE THEREIN

(75) Inventors: Michael George Gorman, Schaumburg; Robert Wesley Bossemeyer, Jr., St. Charles; Michael Steven Pickard, Highland Park; Denise Violetta Kagan, Riverwoods; Scott Christopher Goering, Naperville; Bruce Edward Stuckman, Algonquin, all of IL (US); Michael Tisiker, Westland, MI (US); Jeffrey Neumann, Hoffman Estates; David Orwick, Crystal Lake, both of IL (US)

(73) Assignee: Ameritech Corporation, Hoffman Estates, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,094

(22) Filed: Jul. 20, 1998

(51) Int. Cl.⁷ .......................... H04L 12/28; H04L 12/56; H04L 12/16; H04Q 11/00; H04M 11/00; H04M 1/00; H04M 9/00

(52) U.S. Cl. ...................... 370/419; 370/271; 370/352; 379/93.06; 379/428

(58) Field of Search ........................... 379/93.28, 93.37, 379/142, 93.23, 93.05, 93.06, 428, 440, 93.01, 93.08, 93.09; 376/352, 486, 487, 490, 421, 522, 463; 375/260; 370/419, 420, 271, 352

(56) References Cited

U.S. PATENT DOCUMENTS

| | | | |
|---|---|---|---|
| 3,898,390 A | 8/1975 | Wells et al. | 455/438 |
| 4,430,731 A | 2/1984 | Gimple et al. | 725/131 |

(List continued on next page.)

FOREIGN PATENT DOCUMENTS

| | | |
|---|---|---|
| EP | 0 659 007 A3 | 6/1995 |
| EP | 0 659 007 A2 | 6/1995 |

(List continued on next page.)

OTHER PUBLICATIONS

"A Multi–Drop In–House ADSL Distribution Network", by Peter S. Chow and John M. Cioffi, Serving Humanity Through Communications. Supercomm/ICC, New Orleans, May 1–5, 1994, vol. 1. May 1994, pp. 456–460, Institute of Electrical and Electronics Engineers.

"New Box Opens Doors for CLECs" Asher Waldfogel.

(List continued on next page.)

*Primary Examiner*—Huy D. Vu
*Assistant Examiner*—Kevin C. Harper
(74) *Attorney, Agent, or Firm*—Brinks Hofer Gilson & Lione

(57) ABSTRACT

A telecommunication system includes a digital switch, a local loop coupling the digital switch to a subscriber location, wherein a segment of the local loop includes copper twisted pair and wherein an asymmetrical digital subscriber line is carried by the local loop, the asymmetrical digital subscriber line including a plurality of data packets capable of carrying a plurality of derived digital telephone lines. The telecommunication system further includes a subscriber unit coupled to the asymmetrical digital subscriber line. The subscriber unit monitors the content of at least one of the plurality of data packets, receives an off-hook signal in response to an action of a user, and initiates a first derived digital telephone line of the plurality of derived digital telephone lines in response to the off-hook signal.

15 Claims, 13 Drawing Sheets

U.S. PATENT DOCUMENTS

| | | | |
|---|---|---|---|
| 4,449,218 A | 5/1984 | Strehl | 370/494 |
| 4,512,013 A | 4/1985 | Nash et al. | |
| 4,650,930 A | 3/1987 | Hogeboom et al. | 379/93.08 |
| 4,670,874 A | 6/1987 | Sato et al. | 370/294 |
| 4,740,955 A * | 4/1988 | Litterer et al. | 370/264 |
| 4,901,342 A | 2/1990 | Jones | 379/93.05 |
| 5,127,041 A | 6/1992 | O'Sullivan | 455/557 |
| 5,214,650 A | 5/1993 | Renner et al. | 370/276 |
| 5,291,479 A | 3/1994 | Vaziri et al. | 370/264 |
| 5,305,312 A * | 4/1994 | Fornek et al. | 379/93.06 |
| 5,353,334 A | 10/1994 | O'Sullivan | 455/557 |
| 5,410,343 A | 4/1995 | Coddington et al. | 725/99 |
| 5,428,608 A | 6/1995 | Freeman et al. | |
| 5,440,585 A | 8/1995 | Partridge, III | |
| 5,448,555 A | 9/1995 | Bremer et al. | |
| 5,448,635 A | 9/1995 | Biehl et al. | 379/399 |
| 5,459,730 A | 10/1995 | Bliven | |
| 5,463,616 A | 10/1995 | Kruse et al. | |
| 5,469,496 A | 11/1995 | Emery et al. | 455/461 |
| 5,473,613 A | 12/1995 | Bliven | |
| 5,475,735 A | 12/1995 | Williams et al. | 455/403 |
| 5,479,491 A | 12/1995 | Garcia et al. | 379/88.15 |
| 5,502,760 A | 3/1996 | Gilbert et al. | 379/93.09 |
| 5,506,866 A | 4/1996 | Bremer et al. | |
| 5,511,075 A | 4/1996 | Bhasker | |
| 5,519,731 A | 5/1996 | Cioffi | |
| 5,519,763 A | 5/1996 | Namekawa et al. | 455/556 |
| 5,524,047 A | 6/1996 | Brown et al. | 379/93.11 |
| 5,528,281 A | 6/1996 | Grady et al. | |
| 5,528,285 A | 6/1996 | Morikawa et al. | 348/14.01 |
| 5,528,666 A | 6/1996 | Weigand et al. | 455/412 |
| 5,533,019 A | 7/1996 | Jayapalan | |
| 5,533,105 A | 7/1996 | Brown et al. | 379/93.05 |
| 5,535,204 A | 7/1996 | Li | |
| 5,537,436 A | 7/1996 | Bottoms et al. | |
| 5,550,649 A | 8/1996 | Wong et al. | 358/479 |
| 5,555,258 A | 9/1996 | Snelling et al. | 370/280 |
| 5,563,938 A | 10/1996 | Soshea | 379/201 |
| 5,572,372 A | 11/1996 | Kawan et al. | 359/824 |
| 5,592,538 A | 1/1997 | Kosowsky et al. | 379/93.08 |
| 5,598,456 A | 1/1997 | Feinberg | 379/42 |
| 5,602,837 A | 2/1997 | Takahashi | 370/280 |
| 5,603,095 A | 2/1997 | Uola | 455/67.1 |
| 5,610,910 A | 3/1997 | Focsaneanu et al. | 320/351 |
| 5,610,972 A | 3/1997 | Emery et al. | 455/414 |
| 5,613,191 A | 3/1997 | Hylton et al. | 725/81 |
| 5,617,450 A | 4/1997 | Kakuishi et al. | 375/230 |
| 5,630,204 A | 5/1997 | Hylton et al. | 725/116 |
| 5,636,266 A | 6/1997 | Ranganath et al. | |
| 5,640,444 A | 6/1997 | O'Sullivan | 455/553 |
| 5,644,629 A | 7/1997 | Chow | 379/142.07 |
| 5,664,003 A | 9/1997 | Foladare et al. | 455/459 |
| 5,761,292 A | 6/1998 | Wagner | 379/225 |
| 5,790,548 A | 8/1998 | Sistanizadeh et al. | 370/401 |
| 5,793,498 A | 8/1998 | Scholl et al. | 358/434 |
| 5,796,729 A | 8/1998 | Greaney et al. | 370/345 |
| 5,842,111 A | 11/1998 | Byers | 725/131 |
| 5,854,829 A | 12/1998 | Hughes-Hartogs | 379/100.12 |
| 5,862,202 A | 1/1999 | Bashoura et al. | 379/100.14 |
| 5,864,763 A | 1/1999 | Leung et al. | 455/557 |
| 5,878,078 A | 3/1999 | Griffin et al. | 375/222 |
| 5,889,774 A * | 3/1999 | Mirashrafi et al. | 370/352 |
| 5,889,856 A | 3/1999 | O'Toole et al. | 379/399 |
| 5,892,591 A | 4/1999 | Anglin, Jr. et al. | 358/407 |
| 5,892,764 A * | 4/1999 | Riemann et al. | 370/401 |
| 5,905,781 A * | 5/1999 | Mchale et al. | 379/93.14 |
| 5,937,040 A | 8/1999 | Wrede et al. | 379/93.23 |
| 5,943,404 A | 8/1999 | Sansom et al. | 379/93.06 |
| 5,949,763 A | 9/1999 | Lund | 370/261 |
| 5,970,069 A | 10/1999 | Kumar et al. | 370/402 |
| 5,991,292 A | 11/1999 | Focsneanu et al. | 370/352 |
| 6,005,677 A | 12/1999 | Suzuki | 358/442 |
| 6,005,873 A | 12/1999 | Amit | 370/494 |
| 6,020,915 A | 2/2000 | Bruno et al. | 348/15 |
| 6,028,867 A | 2/2000 | Rawson et al. | 370/463 |
| 6,028,917 A | 2/2000 | Creamer et al. | 379/100.01 |
| 6,044,107 A | 3/2000 | Gatherer et al. | 375/222 |
| 6,044,403 A * | 3/2000 | Gerszberg et al. | 709/225 |
| 6,049,531 A | 4/2000 | Roy | 370/260 |
| 6,064,667 A * | 5/2000 | Gisby et al. | 370/352 |
| 6,069,879 A | 5/2000 | Chatter | 370/295 |
| 6,075,784 A | 6/2000 | Frankel et al. | 370/356 |
| 6,081,517 A | 6/2000 | Liu et al. | 370/352 |
| 6,130,893 A * | 10/2000 | Whittaker et al. | 370/420 |
| 6,141,339 A | 10/2000 | Kaplan et al. | 370/352 |
| 6,167,120 A * | 12/2000 | Kikinis | 379/90.01 |

FOREIGN PATENT DOCUMENTS

| | | |
|---|---|---|
| EP | 0 684 714 A2 | 11/1995 |
| EP | 0 740 451 A1 | 10/1996 |
| WO | 96/29814 | 9/1996 |
| WO | WO 98/20702 | 5/1998 |
| WO | WO 99/53654 | 10/1999 |
| WO | WO 00/65777 | 11/2000 |
| WO | WO 00/65778 | 11/2000 |

OTHER PUBLICATIONS

"Requirements for Local Loop Emulation using AAL2 over xDSL", ATM Forum, Jul. 26, 1999.

"Design Principles Behind a Practical Implementation of Local Loop Emulation using AAL2", ATM Forum, Jul. 26, 1999.

"Loop Emulation Service and New Profile Definition for Voice Over AAL2", ATM Forum, Jul. 26, 1999.

U.S. patent application Ser. No. 08/742,164 entitled "Method and Apparatus for Providing a Derived Digital Telephone Voice Channel" filed Nov. 1, 1996.

U.S. patent application Ser. No. 09/061,833 entitled "Home Gateway Systems with Telephony Functions and Method" filed Apr. 16, 1998.

U.S patent application Ser. No. 09/296,232 entitled "System for Wide Area Computer Networking" filed Apr. 22, 1999.

U.S patent application Ser. No. 09/296,954 entitled "Wide Area Communication Networking" filed Apr. 22, 1999.

U.S. patent application Ser. No. 09/296,233 entitled "Method and System for Providing Facsimile Service Over a Digital Subscriber Line" filed Apr. 22, 1999.

* cited by examiner

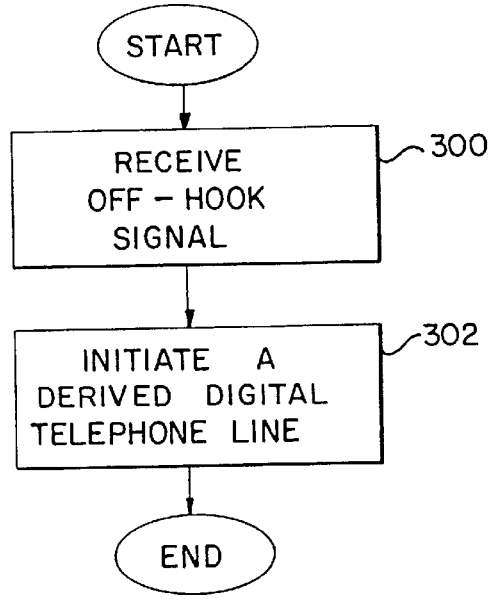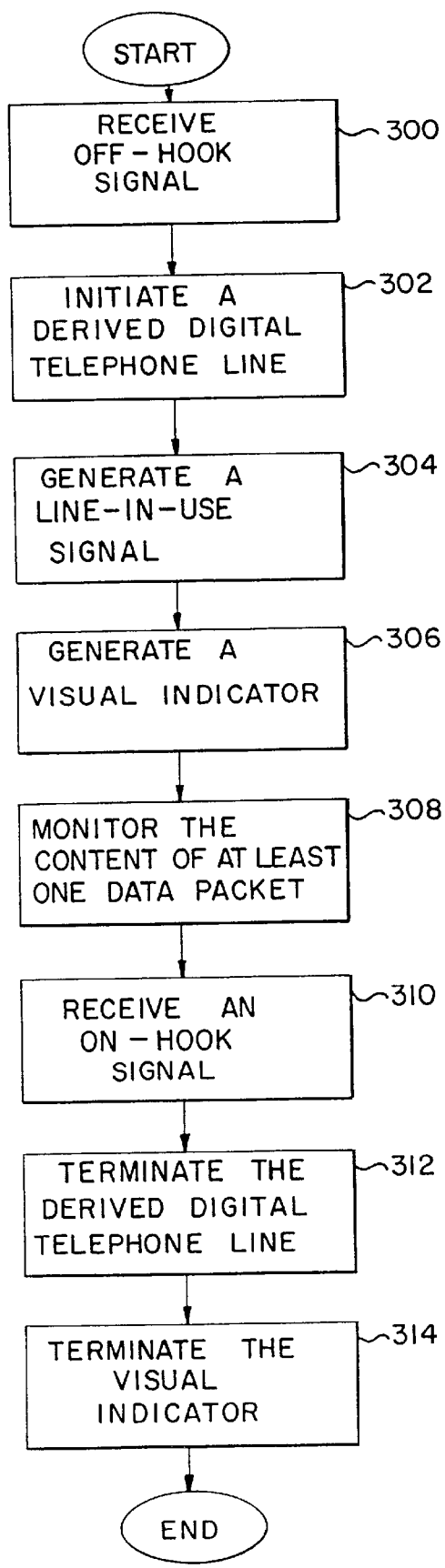

TELECOMMUNICATION SYSTEM, METHOD AND SUBSCRIBER UNIT FOR USE THEREIN

CROSS-REFERENCE TO RELATED APPLICATIONS

The present invention is related to the following patent applications that are assigned to the same assignee as the present invention, the subject matter of which are incorporated herein by reference thereto:

1. "Method and Apparatus for Providing a Derived Digital Telephone Voice Channel," Ser. No. 08/742,164, filed on Nov. 1, 1996.

2. "Home Gateway System Telephony Functions and Method," Ser. No. 09/061,833, Filed on Apr. 16, 1998.

TECHNICAL FIELD

The present invention relates to telecommunication systems, and in particular to subscriber units and methods for interfacing with digital lines.

BACKGROUND OF THE INVENTION

Most telephone service subscribers today use familiar analog Plain Old Telephone Service ("POTS") for placing ordinary voice telephone calls. POTS is typically delivered over a subscriber loop of copper wires installed between each subscriber location, such as a home or office, and the local telephone company ("telco") central office. Over the pair of copper wires, voice signals are transmitted between subscribers and the telco central office. The central office then provides circuit-switching equipment to establish connections between subscribers. In such a circuit-switched system, a circuit connection is established for each call and is maintained for the duration of the call.

Recently, on-line computer services, such as the Internet, have changed the way subscribers use their telephones. On-line computer services typically make a dial-up telephone number available for users with a modem to access the service. Many users of on-line computer services now spend several hours each day on the telephone connected to services such as the Internet. Such a usage pattern ties up the telephone for incoming calls and causes a strain for other members of the household who wish to place calls. In response, households have added a second telephone line for computer data traffic. To provide a second telephone line, a second pair of copper wires is usually provided between the subscriber's location and the telco central office. In addition to more copper wiring, a second telephone line also requires additional central office connection and transmission equipment.

Recently, higher capacity data transmission services have become available to carry a subscriber's computer data to remote computer systems. Such data transmission services often carry data on the same copper pair utilized by POTS. To allow simultaneous data and POTS service and provide greater bandwidth, higher capacity data services operate at frequencies above the 1 KHz to 4 KHz voice frequency band used by POTS. For example, such data services may operate in the frequency range around 80 KHz or higher.

The growing popularity of on-line computer services has also challenged the assumptions upon which the telephone network was constructed. The public switched telephone network (PSTN) is designed with the assumption that only about 10% of residential users and 20% of business users are using the telephone at any given time. The PSTN telephone line and associated circuit-switching equipment are thus designed to be shared by only the fraction of subscribers actually using the telephone at any time. Now, many households use the telephone for several hours each day to carry data traffic to computer services. Using a POTS circuit-switched telephone call to carry data traffic inefficiently consumes hardware resources, since a dedicated circuit connection is consumed for the entire duration of the call.

More recently, packet-switched data networks have been established to carry high-speed data traffic between distributed computer systems. In addition to providing higher data rates, packet-switched networks are more hardware efficient than circuit-switched networks for carrying data. A packet-switched network establishes a virtual circuit connection which uses transmission resources only when data is actually transmitted. Such a virtual connection is well suited for users of computer services who are connected for long periods of time and spend a relatively small proportion of time actually transmitting and receiving data.

Despite the change in communication needs and usage patterns, most data traffic from homes or small offices is carried by POTS voice lines.

BRIEF DESCRIPTION OF THE DRAWINGS

The invention is pointed out with particularity in the appended claims. However, other features of the invention will become apparent and the invention will be best understood by referring to the following detailed description in conjunction with the accompanying drawings in which:

FIG. 13 presents a flowchart representation of a method in accordance with the present invention.

FIG. 14 presents a flowchart representation of a method in accordance with the present invention.

DETAILED DESCRIPTION OF THE PREFERRED EMBODIMENTS

The various embodiments of the present invention yield several advantages over the prior art. In several embodiments, the telecommunication system of the present invention includes a subscriber unit, and methods for use therewith, for accessing one or more derived digital telephone lines carried over a digital subscriber line. Other embodiments of the present invention are directed toward a subscriber interface unit that provides similar functionality to a standard analog telephone set.

Figure 1:
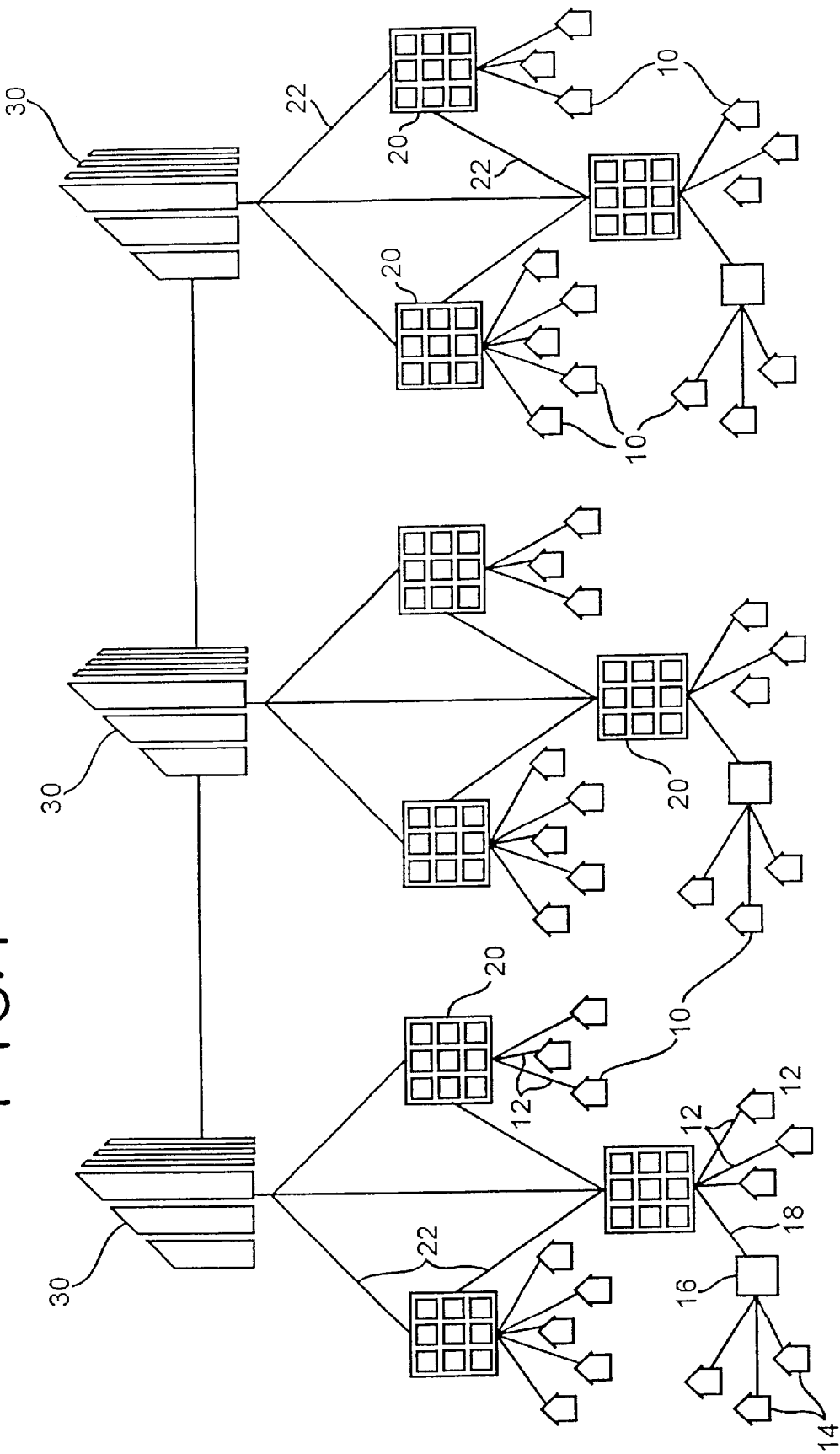
FIG. 1 shows a schematic diagram of a telephone network in accordance with the present invention.

FIG. 1 shows a schematic diagram of a telephone network in accordance with the present invention. Telephone subscribers 10 are typically serviced by analog telephone lines carried to the central office 20 by a subscriber loop 12 including twisted pairs of copper wires. A number of subscribers 14 may also be connected by subscriber loops to a remote terminal 16 which combines a number of subscribers 14 onto a digital multiplexed data line 18 for transmission to the central office 20. For example, a 24 channel multiplexed T1 line is commonly used in North America for the data line 18.

Typically, a number of central offices 20 are connected by direct trunk circuits 22 or through tandem locations 30. The tandem locations 30 provide trunk circuits 22 to connect two central offices or other tandem locations 30. The tandem locations 30 can thus provide connections between central offices which do not have direct interconnecting trunks. It is to be understood that telephone switching networks may have multiple levels of tandem switching or other network topologies. The unique features of the present invention will be identified with respect to the features of the components of the network and their unique configuration.

Figure 2:
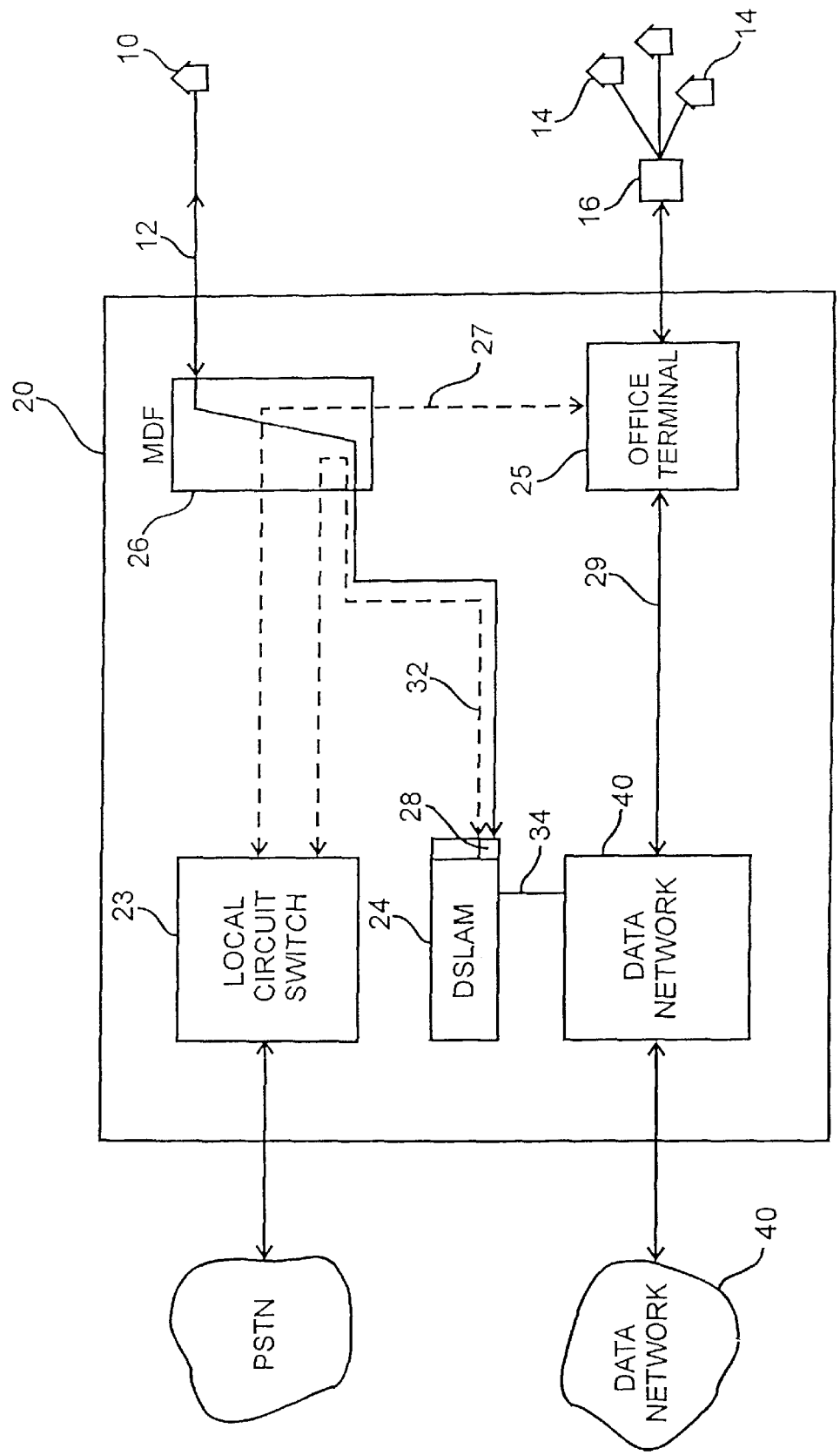
FIG. 2 shows a block diagram of the telco central office of FIG. 1 in accordance with the present invention.

FIG. 2 shows a block diagram of the telco central office 20 of FIG. 1 in accordance with the present invention. The central office 20 preferably includes a means to provide analog telephone lines such as conventional POTS. Conventional POTS is typically handled by the local telephone switching device 23. Local telephone switching devices such as a Northern Telecom DMS-100 or Lucent No. 5 ESS are well known to those skilled in the art. In alternative embodiments, an analog telephone line may also be provided by a Centrex type service or private branch exchange (PBX). As known to those skilled in the art, an analog telephone service may also be provided by a digital carrier system such as a T1 carrier or other type of concentrator.

In addition to POTS service, the central office may also include a means to provide a digital data line. For example, a digital data line may be implemented by a digital subscriber line access multiplexer (DSLAM) 24 to multiplex traffic from digital subscriber loops. Digital subscriber loops or digital carrier systems provided by remote terminal 16 and office terminal 25 provide digital data lines which enable subscribers 10 (FIG. 1) to transmit large amounts of digital multiplexed data traffic over the POTS twisted pair telephone line. The digital subscriber loop is preferably an Asymmetric Digital Subscriber Line (ADSL). ADSL typically implements a digital subscriber line with a maximum data rate from the central office 20 to the subscriber 10 which is higher than the maximum available data rate from the subscriber 10 to the central office 20. For example, ADSL typically provides an asymmetric data rate of 1.5 megabits-per-second (mbs) to the subscriber from the central office and about 400 kilobits-per-second (kbs) from the subscriber location to the central office. Most preferably, ADSL implements an ATM data transmission protocol between the subscriber 10 (FIG. 1) and the central office 20. Of course, other types of data transmission protocols may be utilized. In alternate embodiments, the digital data line may be provided by other types of digital carrier systems such as a SONET based digital systems.

As shown in FIG. 2, the subscriber loop pairs 12 carrying both analog voice and digital data traffic from subscribers 10 to the central office 20 are terminated at a main distribution frame (MDF) 26. From the MDF 26, the subscriber loops 12 are connected to a means for separating POTS voice 32 frequencies from digital data traffic 34 such as a splitter 28, for example. Preferably, the splitter 28 is implemented by the DSLAM 24. The internal operation of the splitter 28 will be described later in more detail in connection with a splitter at the subscriber 10.

The splitter 28 preferably has two outputs: one for POTS signals and another for data traffic. From the splitter 28, the separated POTS voice signals 32 are connected back to the MDF 26 and onto the local switching device 23 handling POTS telephone calls. The data traffic output of the splitter 28 is directed to the DSLAM 24 to multiplex the digital data into a format suitable for transport on a data network 40. Preferably, the DSLAM 24 multiplexes and packages a number of lower signal rate digital data lines to a SONET OC-3 or a DS-1 rate signal which is carried by a fiber optic network. Depending on the data network 40, the DLSAM 24 may operate at higher bit rates such as those appropriate for SONET OC-12. It should be understood that the data network 40 may be of many different topologies. Preferably, the data network 40 is connected to a tandem location 30 to allow access to other central offices.

In the case of subscriber loops that are connected to the central office through a digital loop carrier system (i.e., a remote terminal 16 and an office terminal 25), the DSLAM 24 and its splitter 28 are preferably placed at the remote terminal 16. The data and voice signals are separated with the splitter 28, as described above. The voice signals are carried on the digital loop carrier system to the office terminal 25 where they are connected through the MDF 26 to the local circuit switch 23. Preferably, the data signals are carried on a separate optical fiber or SONET frame in the carrier system so that they can easily be separated from the voice signals in the office terminal 25. These signals are transmitted from the office terminal to the data network 40.

Figure 3:
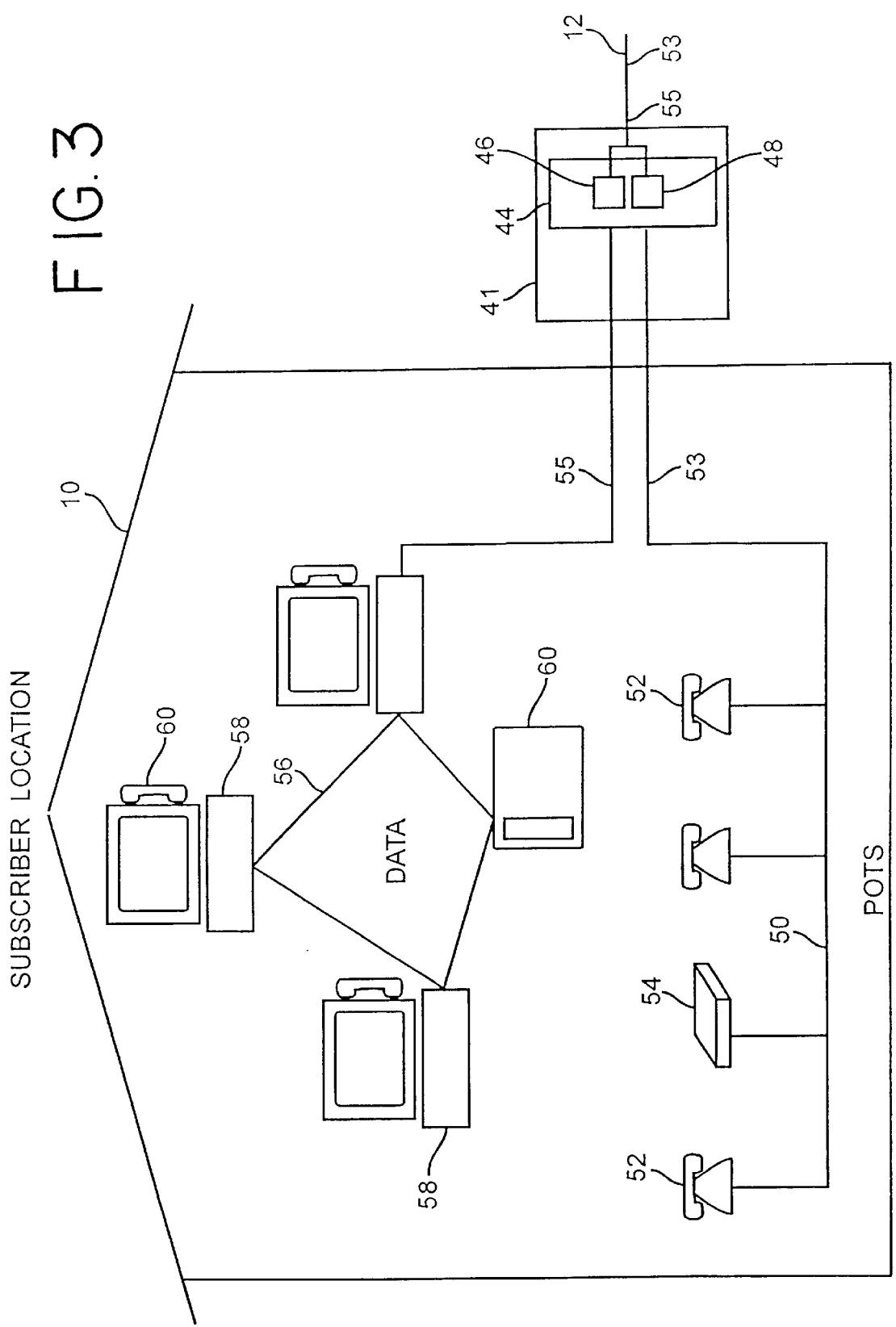
FIG. 3 shows a schematic diagram of a telephone subscriber location 10 such as a typical home or small office in accordance with the present invention.

FIG. 3 shows a schematic diagram of a telephone subscriber location 10 such as a typical home or small office in accordance with the present invention. A network interface device (NID) 41 connects the subscriber to the public switched telephone network (PSTN). The subscriber loop 12 between the subscriber 10 and the central office 20 is terminated at the NID 41. Customer premise equipment (CPE) such as a standard telephone set 52 or other CPE equipment such as a key system, PBX, or computer network 56 to access the PSTN is connected at the NID 41. Voice signals from an analog telephone line 53 and data signals from a digital data line 55 are typically carried to the subscriber 10 on the same subscriber pair 12.

In the preferred embodiment of the invention, the NID 41 includes a means for separating voice frequency signals from data signals. Preferably, a splitter 44 separates voice frequency signals from the data traffic sharing the subscriber loop 12 wire pair. For example, to separate POTS from data traffic, the splitter 44 typically includes a high-pass filter 46 and a low-pass filter 48. To separate POTS voice signals, the low-pass filter 48 blocks high frequency signals, for example signals above 5 KHZ, passing only lower voice frequency signals on a conventional CPE POTS loop 50. The voice signals on the CPE POTS loop 50 are connected to standard telephone 52 such as a Bell 103 set providing conventional POTS service. It should be noted that a conventional computer modem 54 can also utilize the conventional CPE POTS loop 50.

To recover data traffic, the high-pass filter 46 blocks low frequency signals, for example signals below 5 KHz, leaving only high frequency data traffic signals to be sent out on a separate CPE data network loop 56. The CPE data network loop 56 is connected to CPE equipped to access data traffic, for example, a network of personal computers. In the preferred embodiment, the CPE data network 56 implements an asynchronous transfer mode network (ATM). Each of the personal computers 58 is equipped with a ATM network interface card (NIC) to allow the computer to access the CPE data network 56. The NIC 41 preferably also includes data segmentation and reassembly (SAR) capability to packetize data for transmission on the data network 56. Of course, other types of computer networks, such as an Ethernet network, may also be implemented.

Preferably, the CPE data network 56 is also equipped with one or more digital telephones 60 capable of interfacing the data network 56 to allow a subscriber to place a voice telephone call over the CPE data network 56. For example, a digital telephone 60 may be implemented with one of the personal computers 58 on the data network 56 by adding a telephone handset and an appropriate NIC with telephony functions. The telephone handset transmits and receives analog voice signals similar to a conventional handset. The computer/NIC provides SAR capability for converting analog voice to a digital packet stream for transmission over the CPE data network 56. The data network 56 also carries the basic telephony signaling functions. One such system capable of providing such a digital telephone is an ATM network based telephone system from Sphere Communications in Lake Bluff, Ill.

Using the CPE data network 56, the subscriber 10 can place a voice call using a telephone line derived from the digital data line. POTS service operates as a usual over the POTS wiring 50 to provide regular telephone service such as a telephone line carrying analog voice signals. In addition, the data network 56 with digital telephone 60 also has the capability to place voice telephone calls using one or more derived voice lines implemented through the data network, as will be explained below in more detail.

Figure 4:
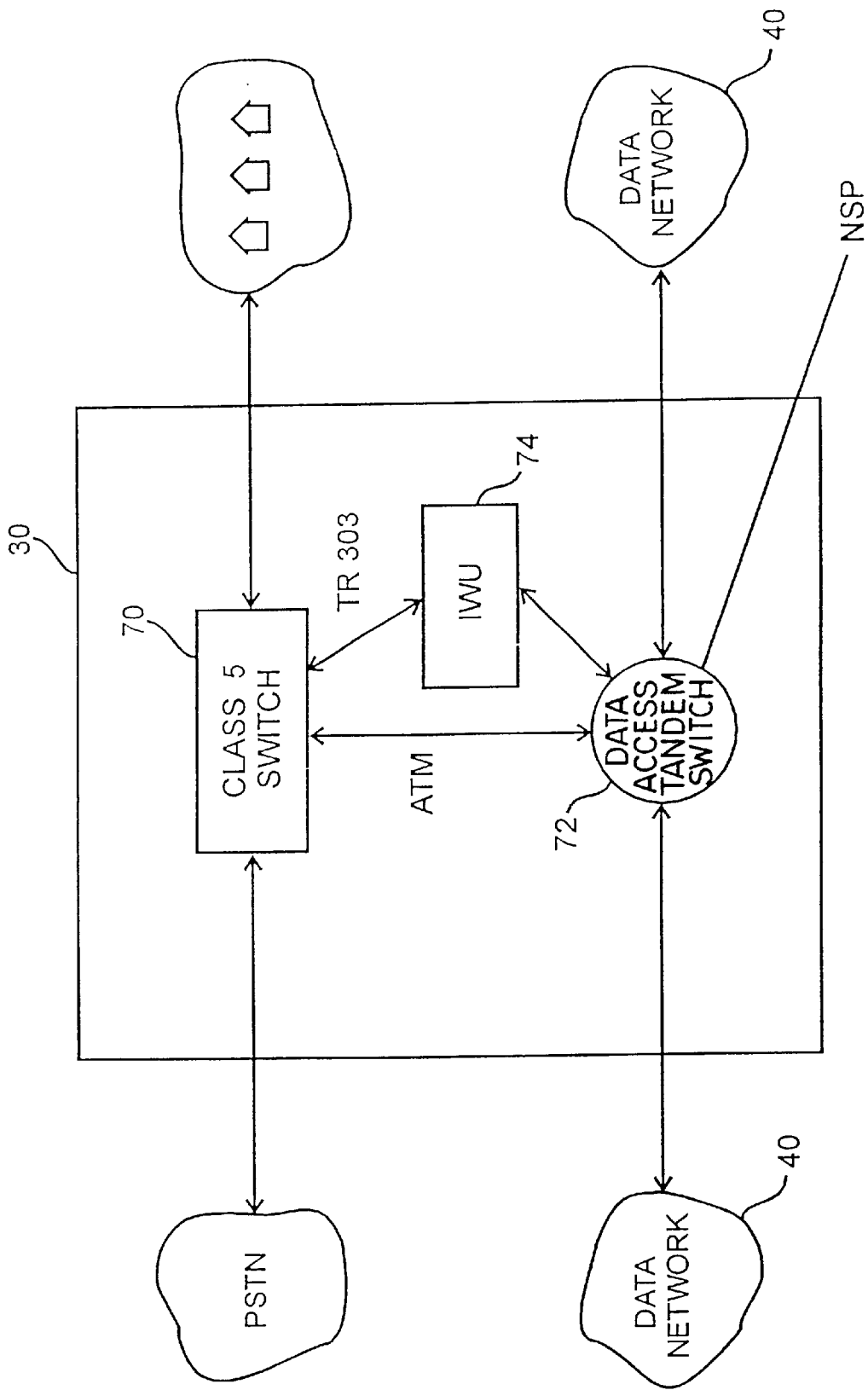
FIG. 4 shows a block diagram of a tandem location in accordance with the present invention.

FIG. 4 shows a block diagram of a tandem location in accordance with the present invention. The Class 5 local switch 70 typically connects local subscriber loops to the telephone network, while a separate tandem voice switch (not shown) provides conventional circuit-switched connections for directing POTS traffic between central offices 20 (FIG. 1) of the PSTN. Class 5 local switches such as the Lucent 5 ESS and the Nortel DMS 100, and tandem voice switches such as the Lucent 4ESS and the Nortel DMS 250 are known to those skilled in the art. In comparison, the means for providing data access to data networks is preferably a packet switch handling digital data traffic. For example, a data access tandem switch 72 provides access to data networks carrying digital data traffic. Preferably, the data networks are equipped to accept ATM packet-switched connections. The data access tandem switch 72 is an ATM fabric switch configured to provide virtual connections on demand between end users and providers of data networks and services. The data access tandem switch 72 may connect end users to various network service providers (NSPs) such as UUNet, MCI, Sprintnet, and AADS.

The tandem location 30 may also include a means to interface the data access tandem 72 and the Class 5 switch. For example, an interworking unit (IWU) 74 may implement an interface between the data access tandem switch 72 and the Class 5 switch 70 of the PSTN. The IWU 74 enables voice telephone calls carried by the data network 40 to access the PSTN through the Class 5 switch 70. The IWU 74 is capable of converting a voice telephone call in the data network protocol from the data access tandem switch 72 into the circuit-switch protocol of the Class 5 switch 70. Preferably, the IWU 74 interfaces an ATM packet data stream to a multiplexed circuit-switch protocol with dynamic allocation of voice channels such as TR-303.

Figure 5:
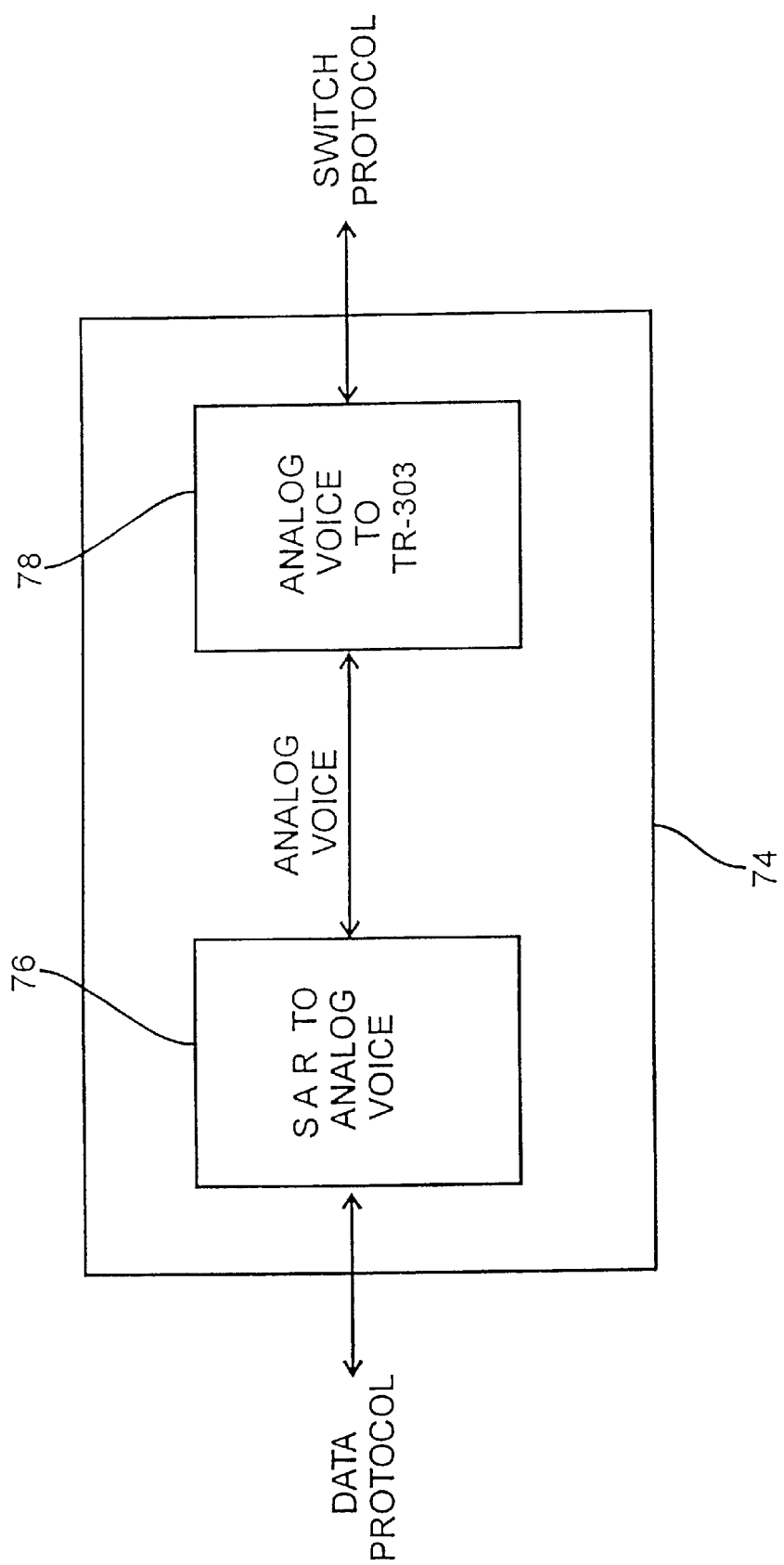
FIG. 5 presents a block diagram representation of an example interworking unit in accordance with the present invention.

FIG. 5 presents a block diagram representation of an example interworking unit in accordance with the present invention. In particular, the IWU 74 performs the SAR 76 of voice data from an ATM stream into a analog voice signal. The analog voice signal is then converted 78 into the data protocol such as a TR-303 protocol. More preferably, as seen in FIG. 4, the IWU 74 converts the packetized ATM voice streams to a digital PCM format which is then converted to the desired TR-303 protocol. It should be noted that the local switch 70 may also be directly connected to a data access tandem 72 without the IWU interface 74. Newer generation digital switches may be capable of directly interfacing with the data transfer protocol of the data access tandem 72. For example, new generation circuit-switches may directly accept an ATM data stream for switching into the PSTN without the need for an IWU.

While a TR-303 protocol is described above, other protocols may likewise be used in accordance with the present invention. In particular, other protocols including a PRI protocol, TR-08 protocol or a TR-57 protocol could likewise be used within the scope of the present invention.

With the system of FIGS. 1–5, a derived voice telephone line using the data network can be implemented and utilized in conjunction with the methods and systems that follow.

A caller places a digital voice call similar to an ordinary telephone call using the digital telephone 60 of FIG. 3. The SAR function of the digital telephone 60 converts the caller's analog voice signals to a packetized digital data stream for transport over the subscriber data network 56. Preferably, the packetized data stream is in an ATM format.

The subscriber data network 56 carries the derived telephone line data stream to the subscriber loop 12 where it is transported on a digital data line to the central office 20 along with POTS traffic. Note, the derived telephone line uses the digital data line of the subscriber data network 56, leaving the POTS telephone line available for analog telephone voice calls.

At the central office 20 shown in FIG. 2, the splitter 28 separates the derived telephone line data stream from POTS traffic. The derived telephone line data stream is multiplexed by the DSLAM 24 together with a number of data streams or derived telephone line data streams from other subscribers. For example, the DSLAM 24 may combine data streams from a number of different subscribers into a higher rate digital signal such as a DS-3 or OC-3 signal. The telephone line data stream is then carried by the OC-3 signal over the data network 40 to the tandem location 30.

At the tandem location 30 shown in FIG. 4, the derived telephone line and data sessions are switched by the data access tandem 72. Preferably, data sessions to a NSP are directly switched by the data access tandem 72 to the desired NSP without entering the PSTN. For voice calls which must enter the PSTN, the data access tandem 72 directs the derived telephone line data streams to the IWU 74.

The IWU 74 preferably converts the derived telephone line data stream to a voice signal in a TR-303 format which can be switched by the Class 5 telephone switch 70. Through the Class 5 switch 70, the derived voice call enters the PSTN and is switched as a POTS call. If needed, a separate tandem switch establishes a circuit connection to the desired central office 20.

Figure 6:
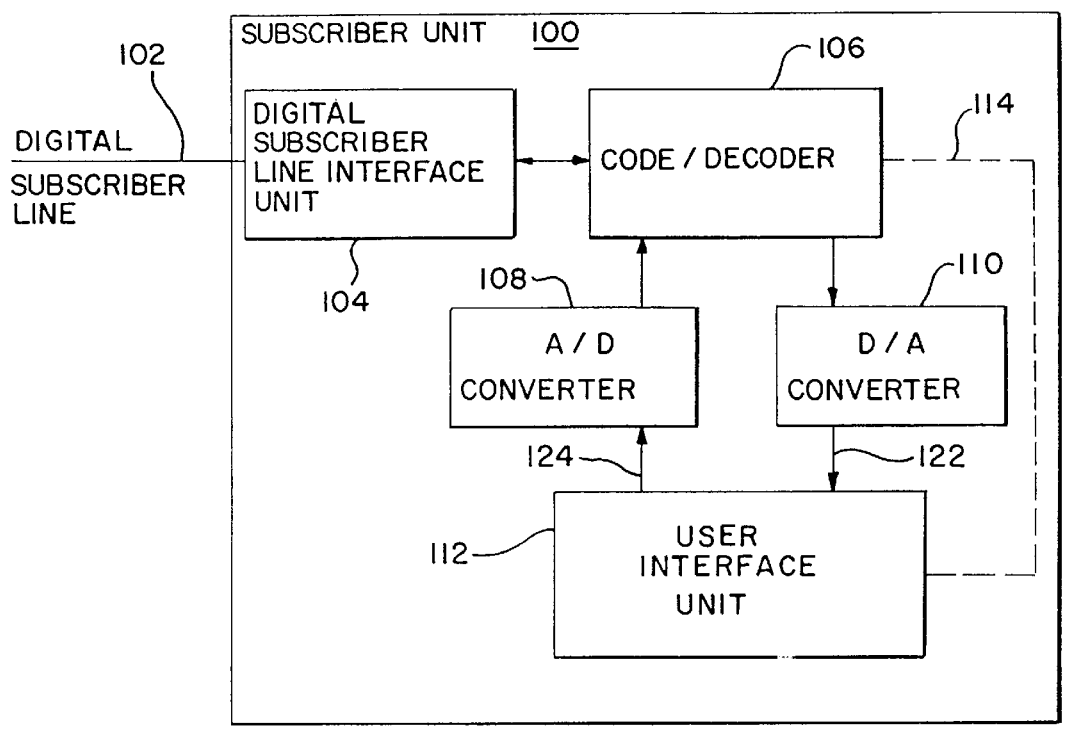
FIG. 6 presents a block diagram of a subscriber unit in accordance with the present invention.

FIG. 6 presents a block diagram of a subscriber unit in accordance with the present invention. In particular, a subscriber unit 100 allows connection with a public switched telephone network. The public switched telephone network has at least one switch and at least one digital subscriber line 102, such as described in FIGS. 1–5, in communication with the switch. In accordance with the present invention, the subscriber unit 100 is operable to send and receive voice calls over the public switched telephone network.

While the various embodiments of the present invention have been described in conjunction with a public switched telephone network, these embodiments could similarly apply to voice communications over other communication networks. In particular, telephone calls, within the scope of the present invention, can be transmitted using a data communications network such as the Internet as a transport medium for a least a portion of a call. In these embodiments of the present invention the functionality of an analog local switch or digital switch could be performed by a server and router corresponding to a local Internet service provider or could include an IP gateway in combination with a central office switch. Further the switch of the present invention could be a central office circuit switch or a packet switch depending on the nature of the network.

The subscriber unit 100 includes a digital subscriber line interface unit 104 receives the plurality of data packets from the digital subscriber line 102 and identifies selected ones of the plurality of received data packets corresponding to a received data stream of a first derived digital telephone. The subscriber unit 100 is further operable to transmit, on the digital subscriber line, a plurality of transmitted data packets corresponding to a transmitted data stream of the first derived digital telephone line.

In one embodiment of the present invention data packets are formatted in accordance with the Asynchronous Transfer Mode (ATM) protocol. Further, a hierarchical protocol structure could likewise be used encompassing, for instance, an Ethernet protocol carried by ATM or an internet protocol (IP) such as TCP/IP carried by ATM. However, other packet data protocols and hierarchical structures and combinations could likewise be implemented within the scope of the present invention.

Packets received by the subscriber unit 100, destined for receipt by subscriber unit 100 include an address, consistent with the particular protocol or protocols used for formatting the data packets, that corresponds to either the subscriber unit 100 or to a corresponding subscriber. In accordance with an embodiment of the present invention whereby an IP is used, data packets directed to the subscriber unit 100 could be identified based on a particular IP node address or URL corresponding to either the particular subscriber unit 100 or to a particular subscriber using subscriber unit 100. Alternatively, an ATM address could be used for the same purpose in an ATM protocol environment.

The subscriber unit 100 further includes a coder/decoder 106. The coder/decoder 106 receives the transmitted data stream from analog-to-digital (A/D) converter 108 and codes the transmitted data stream into the plurality of transmitted data packets. The coder/decoder 106 also receives the plurality of received data packets from the digital subscriber line interface unit 104 and decodes the plurality of received data packets into a received data stream to be transmitted to the digital-to-analog (D/A) converter 110 on line 122.

Analog-to-digital converter 108 converts a transmitted analog signal from user interface unit 112 into the transmitted data stream. Digital-to-analog converter 110 converts the received data stream into a received analog signal for transmission to the user interface unit 112 on line 124.

In this fashion, digital subscriber line interface unit 104, coder/decoder 106, A/D converter 108 and D/A converter 110 operate in concert to send and receive basic telephony signaling between the digital subscriber line 102 and an user interface unit 112. This user interface unit 112 provides the basic functionality of a standard analog telephone set. In particular, the user interface unit 112 provides an interface to a user of the subscriber unit and, at a minimum, generates the transmitted analog signal sent to A/D converter 108 and generates an acoustic signal based on at least a portion of the received analog signal.

In an alternative embodiment of the present invention, a direct data path 114 is provided for communicating with the user interface unit 112. This data path could carry the transmitted data stream, the received data stream or both. In embodiments of the present invention where the user interface unit 112 includes a processor, data path 114 is advantageous to allow direct digital communication without need for the conversion to analog and then back to digital data.

Figure 7:
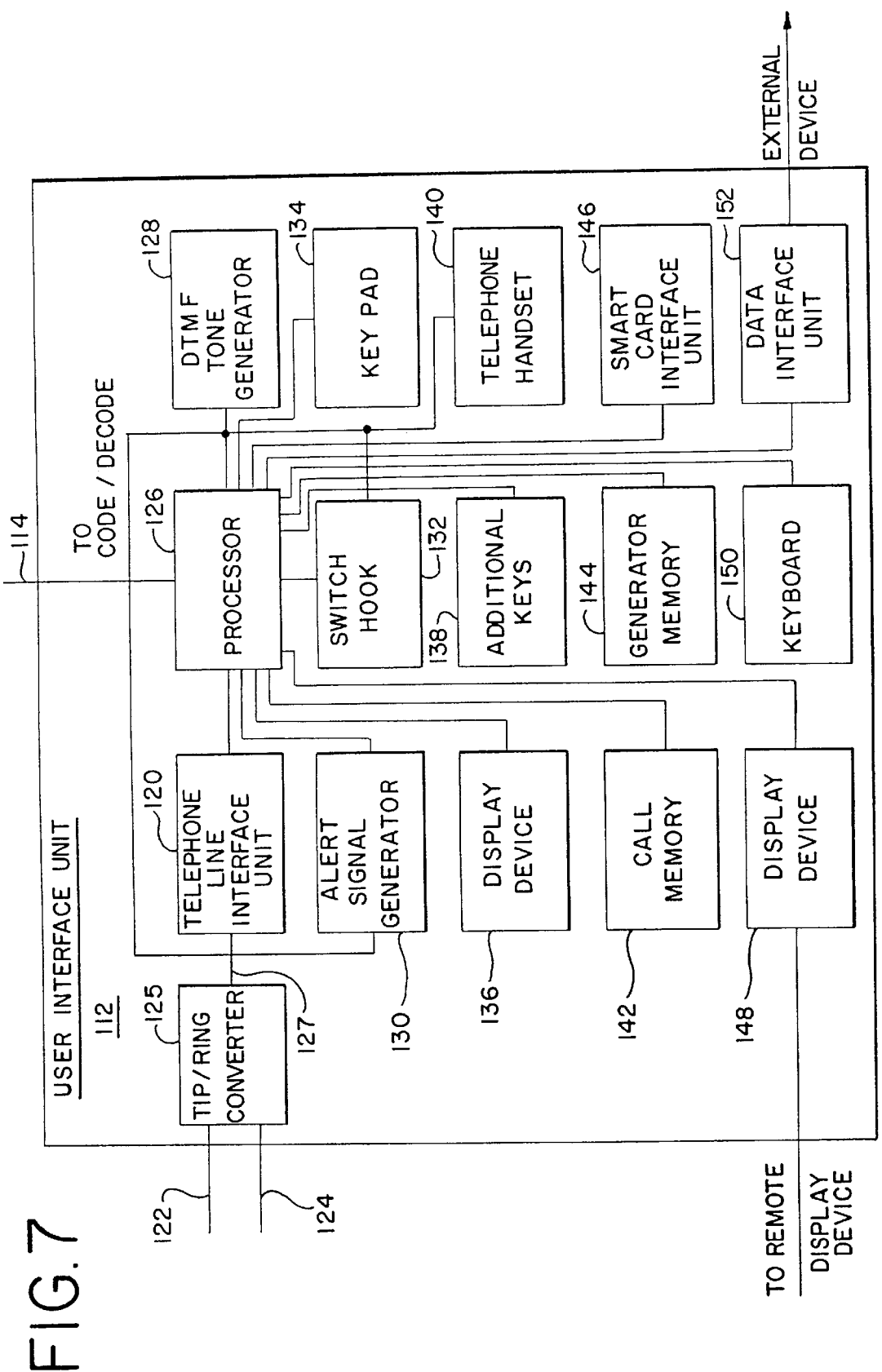
FIG. 7 presents a block diagram representation of an user interface unit in accordance the present invention.

FIG. 7 presents a block diagram representation of an user interface unit in accordance with the present invention. In particular, user interface 112 of FIG. 6 is shown in more detail in accordance with various alternative embodiments.

User interface unit 112 optionally includes a telephone tip/ring converter 125 that converts the analog signal line 122 from the D/A converter 110 to appear as a typical tip/ring pair 127 to telephone line interface unit 120. In particular, tip/ring converter 125 adds a voltage bias and provides any necessary generation or conversion of signal levels from line 122 to appear as a standard analog telephone line, even though the analog signals such as voice and ringing signals on line 122 where transported over a packet data line. In various embodiments of the present invention, the functionality of D/A converter 108, A/D converter 110 and tip/ring converter 125 perform the functions of a line card used in conjunction with a digital central office switch.

Optional telephone line interface unit 120 provides an interface between processor 126 and tip/ring converter 125 by converting basic telephony signals such as on-hook, off-hook, and ring signals for detection by the processor or for generation by the processor to the tip/ring pair 127. In this embodiment, keypad 134 and DTMF tone generator 128, switch hook 132, alert signal generator 130 and telephone handset 140 are further coupled to the tip/ring pair 127 for directly responding to, and/or for generating, the basic telephony signals carried by tip/ring pair 127 in a manner familiar to those skilled in the art.

While the present invention is described as including a switch hook, other similar devices could likewise be used, including a flash key or a receive button, within the scope of the present invention.

However, processor 126, including a plurality of interface ports (not specifically shown) and general memory 144, is likewise capable of responding to and/or directly generating the basic telephony signals in a similar manner. In this fashion, dialed numbers can be recorded and stored for redialing or speed dialing purposes, conditions requiring distinctive ringing patterns can be detected and distinctive rings can be generated, stored voice signals can be generated and received voice signals can be analyzed, and on-hook and off-hook signaling can be generated without the use of the switch hook.

In an alternative embodiment of the present invention the functionality supplied by tip/ring converter 125 and telephone interface unit 120 could be supplemented or supplanted by direct digital connection 114 to processor 126. The plurality of interface ports (not specifically shown) of processor 126 could provide the appropriate conversion from the analog devices such as keypad 134 and DTMF tone generator 128, switch hook 132, alert signal generator 130 and telephone handset 140.

In various embodiments of the present invention the user interface unit advantageously includes a display unit. In various embodiments, this display unit is a liquid crystal display (LCD) capable of displaying information relating to incoming and outgoing calls in additional to command and control information for the operation of the subscriber unit. In particular, a graphical user interface (GUI) for operation of the telephone is implemented using the processor 126, the display device 136 and additional keys 138.

In a further embodiment of the present invention the additional are distributed adjacent to the display unit, the plurality of keys operable by the user to activate selected ones of a plurality of call control options displayed on the display device adjacent thereto. In this fashion, a plurality of call control options such as call transfer, hold, redial, conferencing, forwarding, speed dialing, hands free, line release, line selection, etc., can be implemented by a user by the presentation of a menu of commands and by pressing the key adjacent to the displayed command on the display device.

The display device 136 is further capable of displaying a plurality of data relating to an outgoing call, for instance, by monitoring the digits dialed by the user and by displaying destination telephone number reflected by these digits. The processor further is operable to time the duration of the call from the time the telephone line is off-hook and displaying the duration on the display device. 14. Call memory 142 is available for storing the plurality of data relating to an outgoing call for a plurality of outgoing calls. This data can be retrieved and reviewed by the user or can be downloaded to an external device coupled to the subscriber unit through data interface unit 152.

Processor 126 is further capable of receiving and decoding caller identification data relating to the identity of an incoming caller and the display unit is capable of displaying a plurality of data relating an incoming call. In this fashion, caller ID signals received during the silent interval between the first and second rings of an incoming telephone call can be decoded and displayed to the user before the corresponding line is taken off-hook.

Similarly, for a subscriber to a caller ID/call waiting service who is engaged in a conversation with a first caller, the processor 126 can receive the caller ID information corresponding to a second caller and display it to a user for determination if the first caller should placed on hold and the second call should be answered. Additionally, the call disposition features corresponding a caller ID/call waiting deluxe could likewise be implemented using the display and either the keys of keypad 134 or the additional keys 138.

Call memory 142 is likewise available for storing a plurality of data relating to an incoming call for a plurality of incoming calls. The plurality of data relating the incoming call includes caller ID information of the calling party, the duration of the call (if the call was completed), and data indicating if the incoming call includes a facsimile message. In this embodiment of the present invention the stored data can be retrieved and displayed or downloaded as discussed earlier in conjunction with outgoing call data.

While many of the forgoing discussions have addressed the accessing of a single line, in various embodiments of the present invention the subscriber unit 100 is capable of monitoring and accessing multiple telephone lines, at least one of which is a derived digital telephone line. In these embodiments the display device 136 is capable of showing the status a plurality of lines, and the user is capable of accessing and placing calls on any one of a plurality of lines.

Further, the subscriber unit 100, through the use of processor 126 and in response to a signal generated by the user interface unit 112 and in response to an action of the user, is capable of initiating a connection to a remote central office on one or more derived digital telephone lines carried by the digital subscriber line. In this embodiment of the present invention the processor 126, coupled to the coder/decoder 106, digital subscriber line interface 104 and coder/decoder 106, is capable of accepting data corresponding to a second derived digital telephone line in addition to a first derived digital telephone line, and the processor 126 is further capable of monitoring the status of the second derived digital telephone line. More generally, the subscriber unit 100, in response to a signal generated by the user interface unit 112 in response to an action of the user, is capable of initiating up to N additional derived digital telephone lines, where N is greater than 2.

In an additional embodiment of the present invention the user interface unit 112 further comprises a smart card interface unit 146 capable of accepting and communicating with a smart card (not specifically shown). Preferably, smart card interface unit 146 is compatible with PCMCIA standards and can accept any of a wide variety of such smart cards. In one such embodiment, the smart card inserted into the smart card interface unit 146 stores a plurality of data associated with the user and wherein the processor 126 is capable of downloading a plurality of smart card data from a smart card so that the use of the subscriber unit 100 can be personalized to the particular user.

In one embodiment of the present invention the plurality of smart card data includes a protocol address such as a IP node address or an ATM address corresponding to the user. In this fashion, the address of the telephone could change or be overridden by the address of the user downloaded from the smart card so that calls directed to the user could be sent to the particular subscriber unit 100 over a derived digital telephone line. Once the data was downloaded from the smart card, the subscriber unit can automatically register the presence of the subscriber at the location of the particular subscriber unit 100 by sending a data message to the remote central office over the digital subscriber line. Alternatively, the registration of the presence of the user at the particular subscriber unit 100 containing the smart card could be optionally effectuated only upon activation of the user either in response to a query by the subscriber unit, such as in response to a message displayed on the display device 136 or by action of the user in the absence of such a query.

In a further embodiment of the present invention the smart card data contains other personal options of the user including custom set-up and command options for the subscriber unit. These set-up and command options could include device macros for performing a series of commands on the subscriber unit at the touch of a single button and could also include a user's speed dial list.

In another embodiment of the present invention the user interface unit 112 further includes a keyboard 150 and wherein the subscriber unit is capable of communication with a first data service over the digital subscriber loop. In this fashion the subscriber unit 100 can operate as a PC or network computer to access data services such as internet or world wide web services from the subscriber unit 100. In one such embodiment the communication with the first data service over the digital subscriber loop could use data packets that do not correspond to a derived digital telephone line. However, one or more derived digital lines could, nevertheless, be used for this purpose. In this embodiment the user interface unit 112 further includes a display driver 148 for driving a remote display device. In an applications where communicating with a first data service the device driver 148 allows the use of a larger display than might be integrated in the subscriber unit itself.

In a further embodiment of the present invention, the subscriber unit 100 specifically includes the functionality of a fax modem. In the fashion, the subscriber unit 100 is operable to send a receive a plurality of fax messages. In this embodiment a received fax message or fax message to be sent could be communicated to/from the subscriber unit using the data interface unit 152 in combination with a document scanner or a printer or other specific device.

In an additional embodiment of the present invention, the subscriber unit, under the control of processor 126, performs the functionality of a answering machine where greetings are stored and played to incoming callers, and messages from callers are stored in a memory device such as general memory 144.

Figure 8:
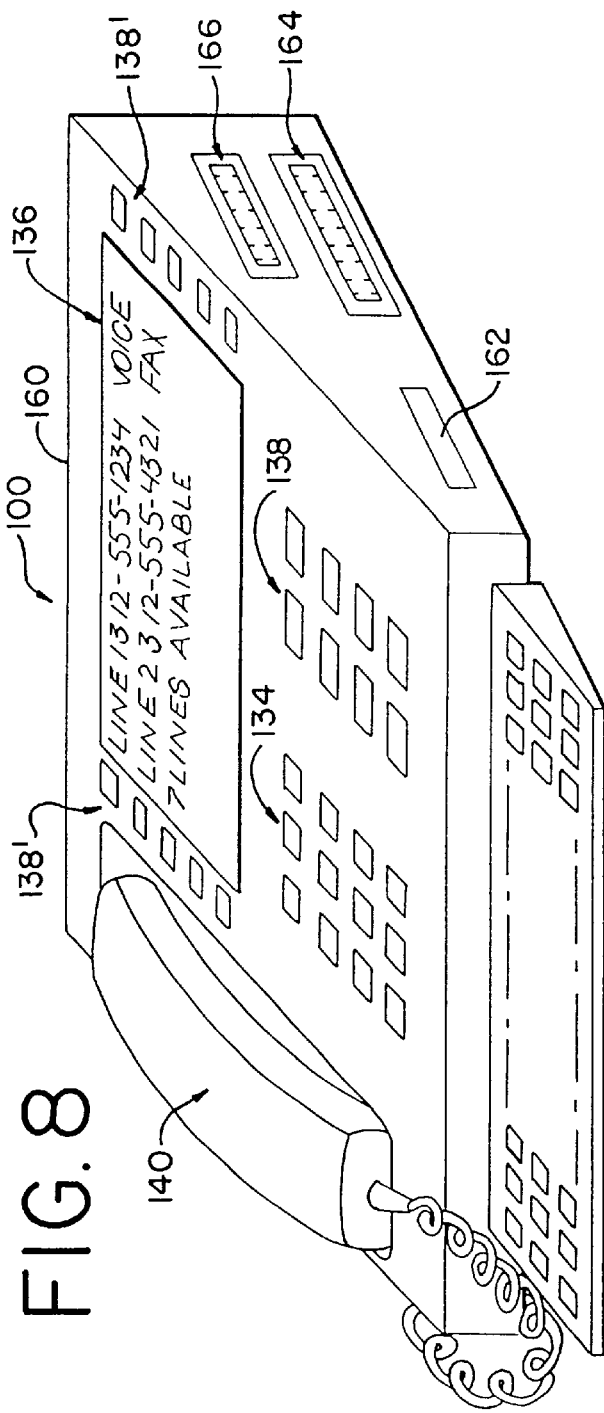
FIG. 8 presents a perspective view of a subscriber unit in accordance with the present invention.

FIG. 8 presents a perspective view of a subscriber unit in accordance with the present invention. In particular, a subscriber unit 100 is presented that incorporates the various features and options presented in conjunction with the descriptions of FIG. 6 and FIG. 7. Housing 160 includes an integral display device 136, keypad 134 and telephone handset 140. Additional keys 138 (that are not adjacent to the display device 136) and additional keys 138' that are adjacent to the display device 136 provide access to advanced controls and features of the subscriber unit 100. Smart card slot 162 corresponds to smart card interface unit 146 disposed within the housing. Display device jack 166 is coupled to display driver 148 within the housing 160 and data interface jack 164 is coupled to data interface unit 152 also disposed within the housing 160.

Figure 9:
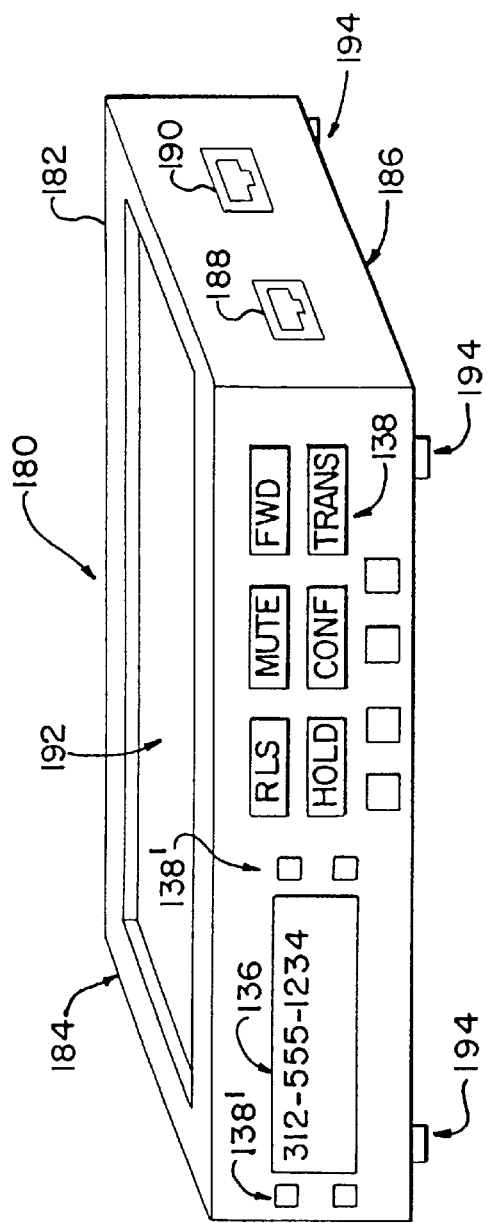
FIG. 9 presents a perspective view of a subscriber interface unit in accordance with the present invention.

FIG. 9 presents a perspective view of a subscriber interface unit in accordance with the present invention. In particular, FIG. 9 presents a subscriber interface unit for use in a telecommunication system including a switch, a local loop coupling the switch to a subscriber location. In this embodiment, a segment of the local loop includes copper twisted pair and the asymmetrical digital subscriber line is carried by the local loop. Further, the asymmetrical digital subscriber line carries a plurality of derived digital telephone lines as described in conjunction with FIGS. 1–5. The subscriber interface unit of FIG. 9 advantageously couples the asymmetrical digital subscriber line to an analog land-line telephone.

Subscriber interface unit 180 includes a housing 182 having a top surface 184 and a bottom surface 186 substantially coplanar to the top surface. An electrical coupler 188 provides a connection to a cable capable of carrying the asymmetrical digital subscriber line. An RJ-11 jack 190 provides a connection to a cable of the analog telephone (not specifically shown). A converter 200, disposed within the housing, coupled to the electrical coupler 188 and to the RJ-11 jack 190, converts the first analog signals generated by the analog telephone into a first plurality of data packets for transmission to a selected one of the plurality of derived digital telephone lines and converts a second plurality of data packets received from the selected one of the plurality of derived digital telephone lines into a second analog signal for transmission to the analog telephone.

In a particular embodiment of the present invention the subscriber interface unit 180 includes several optional features that correspond to features described in conjunction with the subscriber unit 100. Components that are common with subscriber unit 100 are assigned common reference numerals. In addition, subscriber unit 180 includes a first indented portion 192 of top surface 184 for accepting the analog telephone on top thereof. A plurality of non-skid feet are coupled to the bottom surface 186 of the housing 182.

While an RJ-11 jack 190 is shown for coupling to the analog land-line telephone, many other electrical connections including other plug and jack combinations are possible within the scope of this embodiment of the present invention. In a one embodiment of the present invention the digital subscriber line is carried by the standard telephone wiring within a home. In this embodiment, electrical coupler 188 is also implemented using an RJ-11 jack, however, like the RJ-11 jack 190, other electrical connection options are possible within the broad scope of the present invention.

Figure 10:
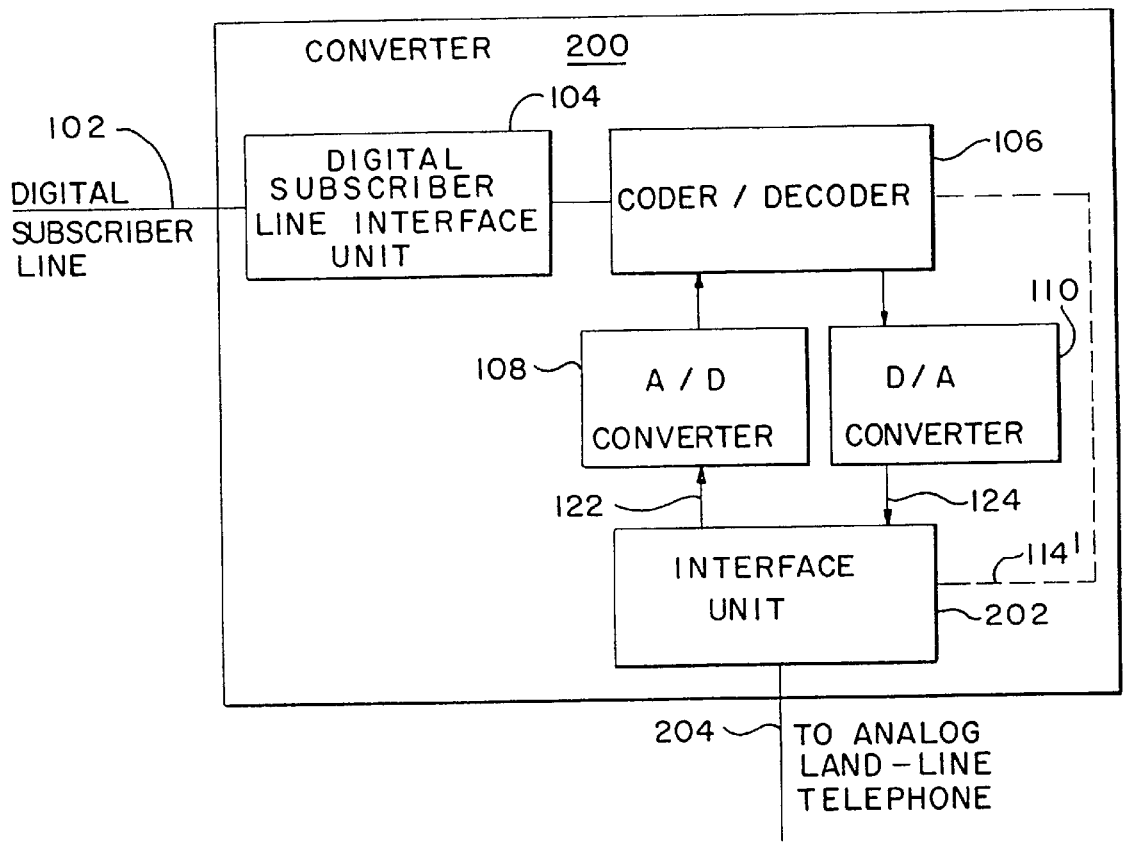
FIG. 10 presents a block diagram representation of a converter in accordance with the present invention.

FIG. 10 presents a block diagram representation of a converter in accordance with the present invention. In particular, a converter 200 is presented for use with the subscriber interface unit 180 of FIG. 9. Digital subscriber line 102 is attached to electrical coupler 188. An analog land-line telephone is coupled to the converter via line 204 connected to RJ-11 jack 190. Components that are common with subscriber unit 100 are assigned common reference numerals. Converter 200 operates in a manner similar to subscriber unit 100, however, some of the components of subscriber unit 100 are supplied by an analog land-line telephone that is attached to the unit. In other words, the functionality of user interface unit 112 is supplied by interface unit 202 in combination with the analog land-line telephone. For the purposes of this disclosure the term "subscriber unit" should include the various embodiments of subscriber unit 100 as well as the various embodiments of subscriber interface unit 180 in combination with an analog land-line telephone.

In accordance with the present invention a multi-line analog telephone can be coupled to the subscriber interface unit 180. In a manner similar to subscriber unit 100, the combination of subscriber interface unit 180 and the multi-line analog land-line telephone is capable of accessing and monitoring the plurality of telephone lines and is further capable of selecting one of the plurality of telephone lines for conducting a voice call. The converter 200 further is capable of converting a third plurality of data packets received from an additional one of the plurality of derived digital telephone lines into a third analog signal for transmission to the analog telephone.

Figure 11:
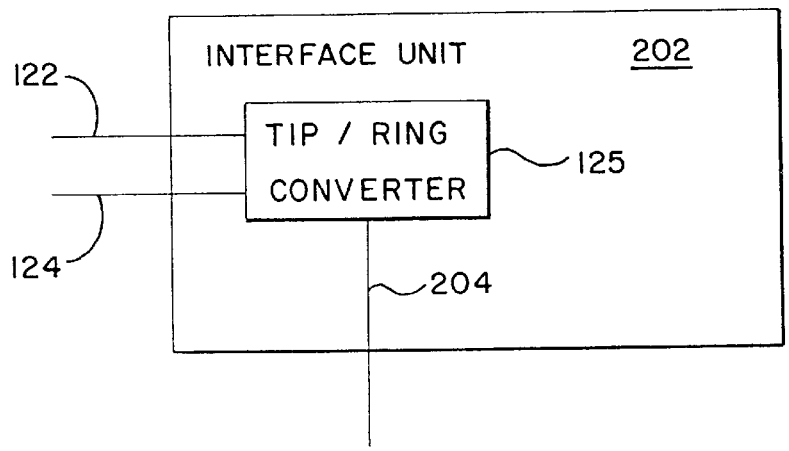
FIG. 11 presents a block diagram representation of an interface unit in accordance with the present invention.

FIG. 11 presents a block diagram representation of an interface unit in accordance with the present invention. In particular, user interface unit 202 is shown for use in accordance with one embodiment of the converter 200 of FIG. 10. Lines 122 and 124 from the A/D converter 108 and D/A converter 110 are coupled to tip/ring converter 125 as described in conjunction with several embodiments of subscriber unit 100. The output 204 appears as a standard tip and ring pair to the analog land-line telephone.

The user interface unit 202 of FIG. 11 presents minimal functionality. The inclusion of additional functions for subscriber interface unit 180 can be desirable. In particular, many of the additional functions described in conjunction with subscriber unit 100 can likewise be included in subscriber interface unit 202 in accordance with the present invention. While the subscriber interface unit 180 of FIG. 9 does not present each of these additional functions, these functions may, nevertheless be included as described in conjunction with an alternative embodiment for interface unit 202 presented in FIG. 12.

Figure 12:
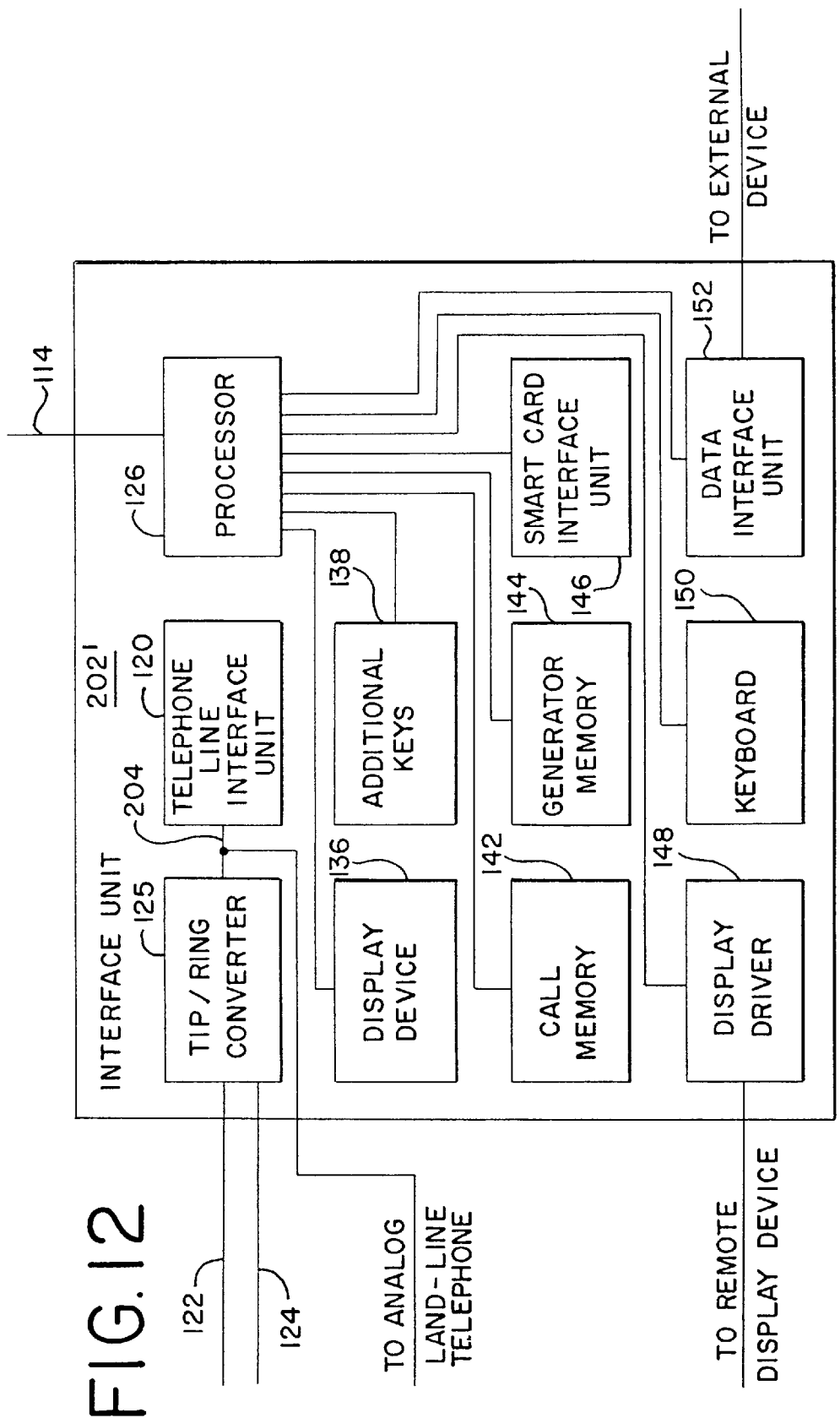
FIG. 12 presents a block diagram representation of an interface unit in accordance with the present invention.

FIG. 12 presents a block diagram representation of an interface unit in accordance with the present invention. In particular, an alternative embodiment of interface 202 designated by reference numeral 202' is presented. In this embodiment, numerous features of subscriber unit 100 are included. Components that are common with subscriber unit 100 are assigned common reference numerals. The output 204 of tip/ring converter 125 is coupled to the analog land-line telephone as well as to telephone line interface unit 120. Processor 126, display device 136, additional keys 138, call memory 142, general memory 144, smart card interface unit 146, display driver 148, keyboard 150 and data interface unit 152 function as previously described in conjunction with user interface unit 112.

FIG. 13 presents a flowchart representation of a method in accordance with the present invention. In particular, a method for initiating a call is presented for use with various embodiments of the subscriber unit 100 or the various embodiments of subscriber interface unit 180 in combination with an analog land-line telephone.

The method begins in step 300 receiving an off-hook signal, generated by the subscriber unit in response to an action of a user. In one embodiment of the present invention this signal would be generated by the switch hook of a subscriber unit responding to the handset going off-hook. In other embodiments, an off-hook signal could be generated by the user selecting an additional key of the subscriber unit such as a "handsfree" key used to initiate a call using a speakerphone function of the subscriber unit or a "send" key commonly used by cellular telephones to initiate a call.

The method continues in step 302 by initiating a first derived digital telephone line of the plurality of derived digital telephone lines in response to the off-hook signal. In particular, the off-hook signal is converted to data in a transmitted data stream that is converted to a transmitted data packet that is transmitted along the digital subscriber line to a switch through an interworking unit. This begins a data packet exchange between the switch and the subscriber unit carrying the basic telephony signals corresponding to the derived digital telephone line. In one embodiment of the present invention the data packet is addressed to an interworking unit where it is converted to a signaling protocol for interface to the switch.

FIG. 14 presents a flowchart representation of a method in accordance with the present invention. In particular, a method for initiating and terminating a call is presented for use with various embodiments of the subscriber unit 100 or the various embodiments of subscriber interface unit 180 in combination with an analog land-line telephone.

Steps 300 and 302 proceed as described in conjunction with the method described in FIG. 12. The method continues in step 304 by generating a line-in-use signal, at the subscriber unit, indicating a first derived digital telephone line is in use. In step 306, a visual indicator is generated at the subscriber unit in response to the line-in-use signal. In a preferred embodiment of the present invention, the visual indicator includes a display, on display device 136, of the destination telephone number and of the duration of the call. Optionally, the visual display includes an indicator of an assigned number for the derived digital line. Thus, in a multi-line environment, a visual designator such as "line 1" can be displayed as well.

The method continues in step 308 by monitoring, at the subscriber unit, the content of at least one of the plurality of data packets of the digital subscriber line. In a preferred embodiment of the present invention, each of the incoming packets is continuously monitored by the subscriber unit to determine if any of the plurality of incoming data packets has an address corresponding to the subscriber unit. If so, the data payload from each such packet is transformed to the received data stream for transfer to the user interface unit to conduct the call. Further the transmitted data stream would be converted into a plurality of data packets addressed to the switch.

In step 310, an on-hook signal is received, generated by the subscriber unit in response to an action of a user. In one embodiment of the present invention this signal would be generated by the switch hook of a subscriber unit responding to the handset being placed on-hook. In other embodiments, an on-hook signal could be generated by the user selecting an additional key of the subscriber unit such as a "line release" key used to terminate a call using a speakerphone function of the subscriber unit.

In step 312 the derived digital telephone line is terminated in response to the on-hook signal. In particular, the call is terminated when the on-hook signal is transmitted to the switch and the subscriber unit stops creating a transmitted data stream and transmitted data packets. The exchange of data packets between the switch and the subscriber unit corresponding to the derived digital telephone line ends. In step 314, the visual display indicating the line is use is also terminated with the termination of the call.

Figure 15:
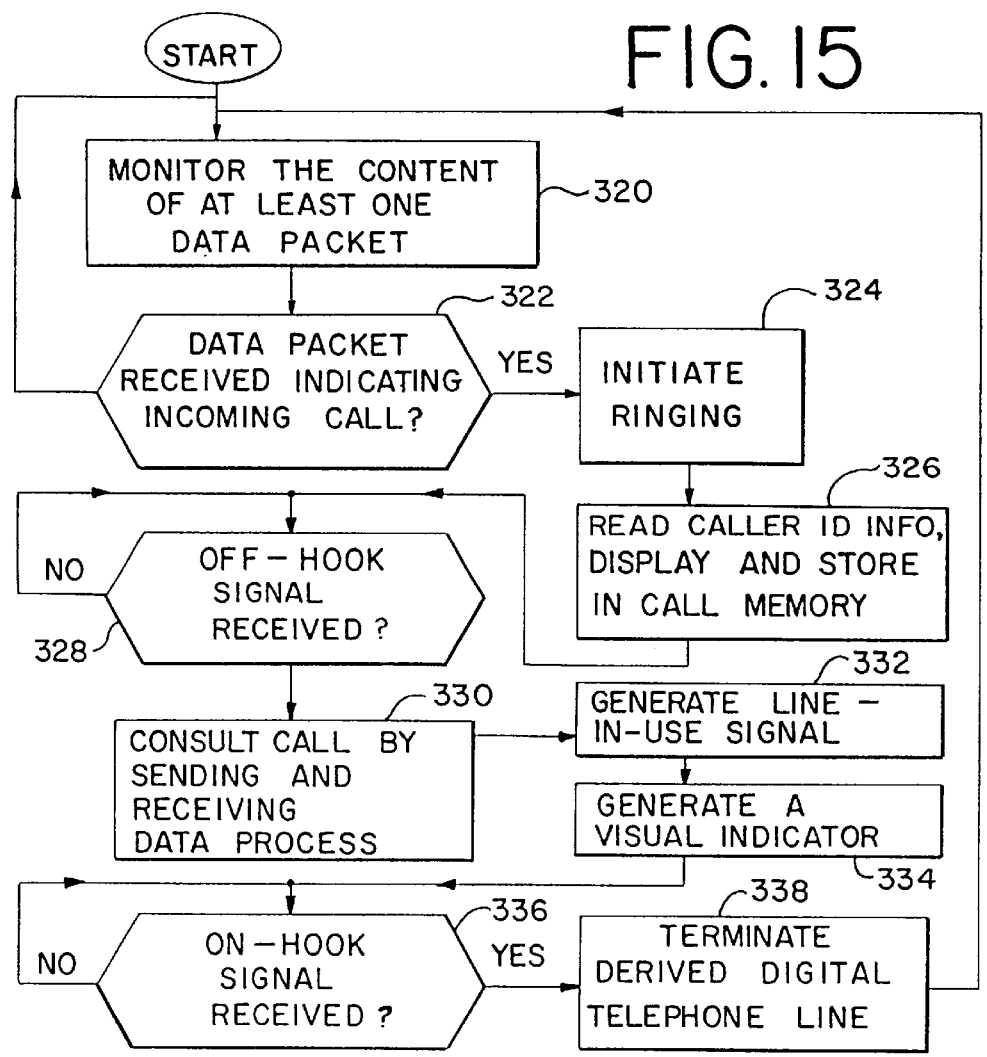
FIG. 15 presents a flowchart representation of a method in accordance with the present invention.

FIG. 15 presents a flowchart representation of a method in accordance with the present invention. In particular, a method for responding to an incoming call is presented for use with various embodiments of the subscriber unit 100 or the various embodiments of subscriber interface unit 180 in combination with an analog land-line telephone. One of ordinary skill in the art will recognize, based on the disclosure herein, that this method may be used in conjunction with the other methods of the present invention described herein.

The method begins is step 320 by monitoring the content of at least one data packet to detect an incoming call. As previously discussed, in a preferred embodiment of the present invention the step of monitoring is performed continuously. Prior to the initiation of an outgoing call or the receipt of an incoming call, the step of monitoring is important to both the detection of usage of other derived digital lines and the detection of an incoming call for the particular subscriber unit. During a call the step of monitoring is important to identifying data packets that correspond to the call in progress.

The method continues in step 322 by determining if a received packet indicates an incoming call. After receiving a data packet addressed to the particular subscriber unit, the data portion of the packet is translated to a received data stream—the data indicating a ring signal from the central office. In response, the method initiates ringing as shown in step 324. In step 326, caller ID information, that is, in a preferred embodiment, transmitted between the silent interval between the first and second ringing signals, is decoded, displayed on the display device, and is stored in a call memory.

The method proceeds in step 328 to determine if an off-hook signal is received. If an off-hook signal is received, the call is conducted in step 330 by continuously sending and receiving data packets corresponding to a derived digital telephone line between the subscriber unit and the central office for the duration of the call. In step 332, a line-in-use signal is generated in response to the off-hook signal and in step 334 a visual indicator is generated and displayed to the user. In a preferred embodiment of the present invention this visual indicator includes the duration of the call and the received caller ID data. The visual indicator may optionally include a line designator indicating the line number of the line in use.

In step 336 the method proceeds by determining if an on-hook signal is generated in response to an action of the user. In step 338, in response to the detection of an on-hook signal the derived digital line is terminated. The method continues by returning to step 320 and continuing to monitor the content of the incoming data packets for the initiation of an incoming call.

In a further embodiment of the present invention, when the remote party engaged in a telephone call on a derived digital telephone line goes on-hook, the subscriber unit generates an on-hook signal a predetermined time later to terminate the line in cases where the remote party has hung-up.

Figure 16:
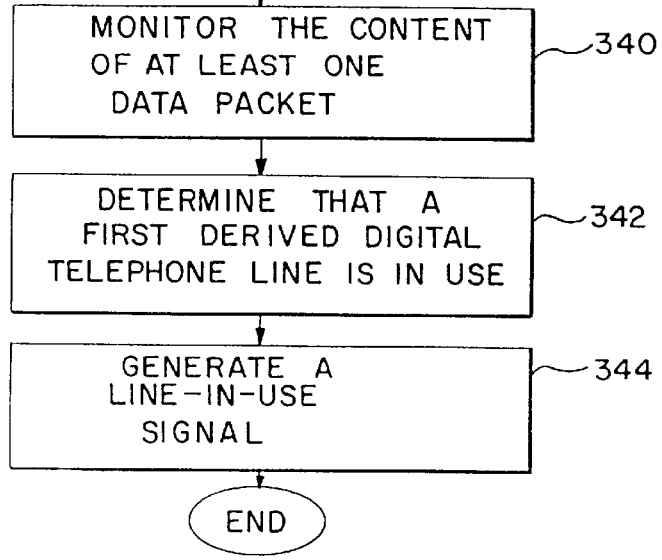
FIG. 16 presents a flowchart representation of a method in accordance with the present invention.

FIG. 16 presents a flowchart representation of a method in accordance with the present invention. In particular, a method for indicating the use of a derived digital telephone line by another subscriber unit is presented for use with various embodiments of the subscriber unit 100 or the various embodiments of subscriber interface unit 180 in combination with an analog land-line telephone. One of ordinary skill in the art will recognize, based on the disclosure herein, that this method may be used in conjunction with the other methods of the present invention described herein.

The method begins in step 340 by monitoring, at the subscriber unit, the content of at least one of the plurality of data packets corresponding to the digital subscriber line. The method continues in step 342 by determining that a first derived digital telephone line is in use based on the content of the at least one of the plurality of data packets.

In this embodiment of the present invention, the subscriber unit monitors the traffic of data packets to determine the presence of incoming and outgoing calls by other subscriber units that share the same digital subscriber line. In one such embodiment the addresses of the other subscriber units is recorded in the particular subscriber unit of interest so that packets addressed to the other subscriber units can be read. In an alternative embodiment of the present invention all incoming data packets are monitored for the presence of basic telephony signals to determine if other derived digital telephone lines are in use.

In step 344 a line-in-use signal is generated, at the subscriber unit, indicating a first derived digital telephone line is in use. This line-in-use signal can be used in the subscriber unit to display information on the status of one or more additional lines that are use by other subscriber units connected to the same digital subscriber line.

In operation, the present invention allows a plurality of subscriber units to be advantageously connected to a single subscriber line. The nature of the derived digital telephone line allows additional telephone lines to be added on demand up to the bandwidth limits of the digital subscriber loop. All of these lines can be monitored and accessed by a single subscriber unit connected to the digital subscriber line. The subscriber unit of the present invention is capable of performing the advanced features of a multi-line centrex-based system without the necessity of the additional hardware. For instance, each subscriber unit can perform three-way calling, call transfer, call forwarding, call holding etc.

Figure 17:
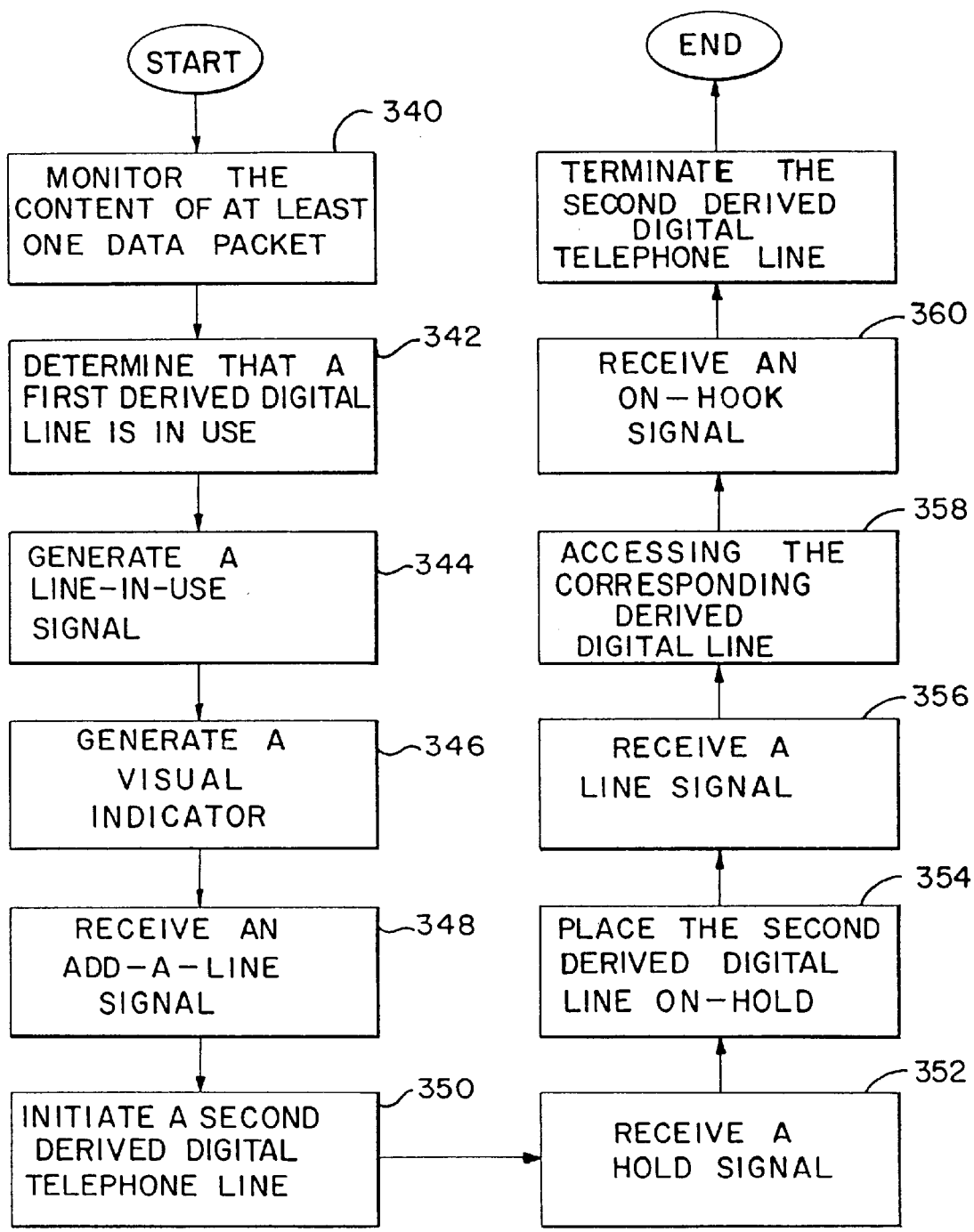
FIG. 17 presents a flowchart representation of a method in accordance with the present invention.

FIG. 17 presents a flowchart representation of a method in accordance with the present invention. In particular, a more detailed method for indicating the use of a derived digital telephone line by another subscriber unit is presented for use with various embodiments of the subscriber unit 100 or the various embodiments of subscriber interface unit 180 in combination with an analog land-line telephone. One of ordinary skill in the art will recognize, based on the disclosure herein, that this method may be used in conjunction with the other methods of the present invention described herein.

Steps 340, 342 and 344 correspond to similar steps presented in conjunction with FIG. 16. Step 346 proceeds by generating a visual indicator in response to the line-in-use signal. In a preferred embodiment of the present invention this visual indicator includes the duration of the call, the received caller ID data. The visual indicator further includes a line designator indicating the line number of the line in use.

In step 348 an add-a-line signal is received, generated in response to an action by the user. In one embodiment of the present invention, this signal is generated by an off-hook signal where a line is currently in use. In this fashion the subscriber unit defaults to adding a new line rather than adding the user to a call on an existing line when the receiver is picked-up during a period when another derived digital telephone line is in use. In this embodiment, an existing call would be accessed by a user by pressing another key, such as a soft key, adjacent to the portion of display indicating that an call is progress. In an alternative embodiment the functions could be reversed and an off-hook signal would default to joining an existing call and an additional key could be used to generate an add-a-line signal.

The method proceeds in step 350 by initiating a second derived digital line by setting up two-way packet data communication with the local central office. Optional steps 352 and 354 correspond to receiving a hold signal generated by the action of the user, such a pressing a hold button, and placing the second derived digital line on "hold". Optional steps 356 and 358 correspond to receiving a signal based on the action of a user indicating one of a plurality of derived digital lines that are currently active and accessing the corresponding one of the plurality of derived digital lines.

In step 360 an on-hook signal is received and in step 362, the second derived digital line is terminated in response to the on-hook signal. These steps are similar in scope to steps described in conjunction with the methods of FIGS. 14 and 15.

While various embodiments of the present invention have been described as having a single address or single telephone number that corresponds to a subscriber unit. The subscriber unit of the present invention could likewise respond to a plurality of derived digital lines corresponding to multiple IP node addresses, URLs, ATM addresses or telephone numbers. In this fashion, multiple derived digital lines may be directed to a single subscriber unit via multiple addresses or multiple telephone numbers.

The various methods described herein, in a preferred embodiment, are intended for operation as software programs running on a computer processor. One of ordinary skill in the art will recognize that other hardware implementations such as application specific integrated circuits, programmable logic arrays and other hardware devices could likewise be constructed to implement the methods described herein. In should also be noted that the various methods of the present invention could be stored on a tangible storage medium such as a magnetic or optical disk, read-only memory or random access memory and be produced as an article of manufacture.

Thus, there has been described herein a concept, as well as several embodiments including a preferred embodiment, of a telecommunication system, method and subscriber unit for use therewith. The various embodiments of methods and systems, by enabling telecommunications services over a derived digital telephone line of a digital subscriber line, provide a significant improvement over the prior art. Additionally, the various embodiments of the present invention herein-described have other features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall the true spirit and scope of the invention.

What is claimed is:

1. A subscriber interface unit for use in a telecommunication system including a digital switch, a local loop coupling the digital switch to a subscriber location, wherein a segment of the local loop includes copper twisted pair and wherein an asymmetrical digital subscriber line is carried by the local loop, the asymmetrical digital subscriber line including a plurality of derived digital telephone channels, the subscriber interface unit for coupling the asymmetrical digital subscriber line to an analog land-line telephone, the subscriber interface unit comprising:

a housing having a top surface and a bottom surface substantially coplanar to the top surface;

an electrical coupler, coupled to the housing for connection to a cable carrying the asymmetrical digital subscriber line;

an RJ-11 jack, coupled to the housing, for connection to a cable of the analog telephone;

a converter, coupled to the electrical coupler and to the RJ-11 jack, for converting the first analog signals generated by the analog telephone into a first plurality of data packets for transmission to a selected one of the plurality of derived digital telephone channels and for converting a second plurality of data packets received from the selected one of the plurality of derived digital telephone channels into a second analog signal for transmission to the analog telephone; and wherein the analog telephone in combination with the subscriber interface unit is capable of accessing and monitoring the plurality of derived digital telephone channels and is further capable of selecting one of the plurality of telephone channels for conducting a voice call, and wherein the converter further is capable of converting a third plurality of data packets received from an additional one of the plurality of derived digital telephone channels into a third analog signal for transmission to the analog telephone.

2. The subscriber interface unit of claim 1 wherein the top surface of the housing includes a first indented portion for accepting the analog telephone on top thereof.

3. The subscriber unit of claim 2 wherein the housing has a height and a width and wherein the width of the housing is greater than the height.

4. The subscriber unit of claim 2 further comprising a plurality of non-skid feet coupled to the bottom surface of the housing.

5. The telecommunication system of claim 1 wherein the asymmetrical digital subscriber line further includes at least one data channel for carrying data signals not related to the plurality of derived digital telephone channels.

6. A subscriber interface unit for use in a telecommunication system including a digital switch, a local loop coupling the digital switch to a subscriber location, wherein a segment of the local loop includes copper twisted pair and wherein an asymmetrical digital subscriber line is carried by the local loop, the asymmetrical digital subscriber line including a plurality of derived digital telephone channels, the subscriber interface unit for coupling the asymmetrical digital subscriber line to an analog land-line telephone, the subscriber interface unit comprising:

a housing;

an electrical coupler, coupled to the housing for connection to a cable carrying the asymmetrical digital subscriber line;

an RJ-11 jack, coupled to the housing, for connection to a cable of the analog telephone;

a converter, coupled to the electrical coupler and to the RJ-11 jack, for converting the first analog signals generated by the analog telephone into a first plurality of data packets for transmission to a selected one of the plurality of derived digital telephone channels and for converting a second plurality of data packets received from the selected one of the plurality of derived digital telephone channels into a second analog signal for transmission to the analog telephone; and wherein the analog telephone in combination with the subscriber interface unit is capable of accessing and monitoring the plurality of derived digital telephone channels and is further capable of selecting one of the plurality of telephone channels for conducting a voice call, and wherein the converter further is capable of converting a third plurality of data packets received from an additional one of the plurality of derived digital telephone channels into a third analog signal for transmission to the analog telephone.

7. The subscriber interface unit of claim 6 wherein the housing comprises a top having a first indented portion for accepting the analog telephone on top thereof.

8. The subscriber interface unit of claim 6 wherein the housing has a height and a width and wherein the width of the housing is greater than the height.

9. The subscriber interface unit of claim 6 further comprising a plurality of non-skid feet coupled to a bottom surface of the housing.

10. The subscriber interface unit of claim 6 wherein the asymmetrical digital subscriber line further comprises at least one data channel for carrying data signals not related to the plurality of derived digital telephone channels.

11. A subscriber interface unit for use in a telecommunication system including a digital switch, a local loop coupling the digital switch to a subscriber location, wherein a segment of the local loop includes copper twisted pair and wherein an asymmetrical digital subscriber line is carried by the local loop, the asymmetrical digital subscriber line including a plurality of derived digital telephone channels, the subscriber interface unit for coupling the asymmetrical digital subscriber line to an analog land-line telephone, the subscriber interface unit comprising:

a housing;

an electrical coupler, coupled to the housing for connection to a cable carrying the asymmetrical digital subscriber line;

a telephone line coupler, coupled to the housing, for connection to a cable of the analog telephone;

a converter, coupled to the electrical coupler and to the telephone line coupler, for converting the first analog signals generated by the analog telephone into a first plurality of data packets for transmission to a selected one of the plurality of derived digital telephone channels and for converting a second plurality of data packets received from the selected one of the plurality of derived digital telephone channels into a second analog signal for transmission to the analog telephone; and wherein the analog telephone in combination with the subscriber interface unit is capable of accessing and monitoring the plurality of derived digital telephone channels and is further capable of selecting one of the plurality of telephone channels for conducting a voice call, and wherein the converter further is capable of converting a third plurality of data packets received from an additional one of the plurality of derived digital telephone channels into a third analog signal for transmission to the analog telephone.

12. The subscriber interface unit of claim 11 wherein the housing comprises a top having a first indented portion for accepting the analog telephone on top thereof.

13. The subscriber interface unit of claim 11 wherein the housing has a height and a width and wherein the width of the housing is greater than the height.

14. The subscriber interface unit of claim 11 further comprising a plurality of non-skid feet coupled to a bottom surface of the housing.

15. The subscriber interface unit of claim 11 wherein the asymmetrical digital subscriber line further comprises at least one data channel for carrying data signals not related to the plurality of derived digital telephone channels.

* * * * *